(12) United States Patent
Agarwal et al.

(10) Patent No.: US 10,027,605 B2
(45) Date of Patent: Jul. 17, 2018

(54) TRAFFIC AND LOAD AWARE DYNAMIC QUEUE MANAGEMENT

(71) Applicant: VMware, Inc., Palo Alto, CA (US)

(72) Inventors: Shilpi Agarwal, San Mateo, CA (US); Lenin Singaravelu, Sunnyvale, CA (US); Ayyappan Veeraiyan, Cupertino, CA (US); Chien-Chia Chen, Mountain View, CA (US)

(73) Assignee: VMware, Inc., Palo Alto, CA (US)

( * ) Notice: Subject to any disclaimer, the term of this patent is extended or adjusted under 35 U.S.C. 154(b) by 132 days.

(21) Appl. No.: 14/137,961

(22) Filed: Dec. 20, 2013

(65) Prior Publication Data

US 2015/0055468 A1 Feb. 26, 2015

Related U.S. Application Data

(60) Provisional application No. 61/870,201, filed on Aug. 26, 2013.

(51) Int. Cl.
| | |
|---|---|
| *H04L 12/861* | (2013.01) |
| *H04L 12/863* | (2013.01) |
| *H04L 12/935* | (2013.01) |
| *H04L 12/851* | (2013.01) |
| *H04L 12/859* | (2013.01) |

(Continued)

(52) U.S. Cl.
CPC ...... *H04L 49/9047* (2013.01); *H04L 47/2475* (2013.01); *H04L 47/2483* (2013.01); *H04L 47/6295* (2013.01); *H04L 47/781* (2013.01); *H04L 49/30* (2013.01); *H04L 43/0888* (2013.01)

(58) Field of Classification Search
None
See application file for complete search history.

(56) References Cited

U.S. PATENT DOCUMENTS

| | | |
|---|---|---|
| 6,680,934 B1 | 1/2004 | Cain |
| 6,959,002 B2 | 10/2005 | Wynne et al. |

(Continued)

FOREIGN PATENT DOCUMENTS

| | | |
|---|---|---|
| EP | 14180347.8 | 8/2014 |
| EP | 2843891 | 3/2015 |

(Continued)

OTHER PUBLICATIONS

Portions of prosecution history of EP 14180347.8, dated Nov. 18, 2014 VMware, Inc.

(Continued)

*Primary Examiner* — Suk Jin Kang

(57) ABSTRACT

Some embodiments provide a queue management system that efficiently and dynamically manages multiple queues that process traffic to and from multiple virtual machines (VMs) executing on a host. This system manages the queues by (1) breaking up the queues into different priority pools with the higher priority pools reserved for particular types of traffic or VM (e.g., traffic for VMs that need low latency), (2) dynamically adjusting the number of queues in each pool (i.e., dynamically adjusting the size of the pools), (3) dynamically reassigning a VM to a new queue based on one or more optimization criteria (e.g., criteria relating to the underutilization or overutilization of the queue).

33 Claims, 16 Drawing Sheets

(51) Int. Cl.
*H04L 12/911* (2013.01)
*H04L 12/26* (2006.01)

(56) References Cited

U.S. PATENT DOCUMENTS

| | | | |
|---|---|---|---|
| 7,369,500 B1* | 5/2008 | Gallagher et al. | 370/235 |
| 7,623,538 B1* | 11/2009 | Tripathi et al. | 370/420 |
| 7,818,452 B2 | 10/2010 | Matthews et al. | |
| 7,860,120 B1* | 12/2010 | Wang et al. | 370/418 |
| 7,936,770 B1 | 5/2011 | Frattura et al. | |
| 7,948,986 B1 | 5/2011 | Ghosh et al. | |
| 8,190,767 B1 | 5/2012 | Maufer et al. | |
| 8,589,941 B2 | 11/2013 | Cardona et al. | |
| 8,990,799 B1 | 3/2015 | Cardona et al. | |
| 2003/0093481 A1 | 5/2003 | Mitchell et al. | |
| 2005/0201398 A1 | 9/2005 | Naik et al. | |
| 2005/0207407 A1 | 9/2005 | Baumberger | |
| 2005/0228971 A1 | 10/2005 | Samra et al. | |
| 2007/0061492 A1 | 3/2007 | van Riel | |
| 2007/0162572 A1* | 7/2007 | Aloni et al. | 709/219 |
| 2007/0217409 A1 | 9/2007 | Mann | |
| 2007/0244972 A1* | 10/2007 | Fan | 709/205 |
| 2007/0280277 A1* | 12/2007 | Lund | H04L 49/205 370/412 |
| 2008/0022016 A1* | 1/2008 | Tripathi | G06F 12/1081 709/250 |
| 2008/0072305 A1 | 3/2008 | Casado et al. | |
| 2008/0123676 A1* | 5/2008 | Cummings et al. | 370/419 |
| 2008/0240140 A1* | 10/2008 | Dabagh | H04L 49/90 370/412 |
| 2009/0097495 A1 | 4/2009 | Palacharla et al. | |
| 2009/0129271 A1 | 5/2009 | Ramankutty et al. | |
| 2009/0161684 A1* | 6/2009 | Voruganti | H04L 49/9078 370/412 |
| 2009/0235325 A1 | 9/2009 | Dimitrakos et al. | |
| 2010/0070677 A1 | 3/2010 | Thakkar | |
| 2010/0322265 A1* | 12/2010 | Gopinath et al. | 370/417 |
| 2011/0142064 A1 | 6/2011 | Dubal et al. | |
| 2011/0320632 A1 | 12/2011 | Karino | |
| 2012/0033680 A1* | 2/2012 | Gopinath et al. | 370/412 |
| 2012/0155256 A1* | 6/2012 | Pope | G06F 13/128 370/230 |
| 2012/0213075 A1 | 8/2012 | Koie et al. | |
| 2012/0324449 A1 | 12/2012 | Huetter et al. | |
| 2013/0058335 A1 | 3/2013 | Koponen et al. | |
| 2013/0073743 A1 | 3/2013 | Ramasamy et al. | |
| 2013/0100960 A1 | 4/2013 | Tsirkin et al. | |
| 2013/0104124 A1 | 4/2013 | Tsirkin et al. | |
| 2013/0114599 A1* | 5/2013 | Arad | H04L 49/358 370/392 |
| 2013/0155859 A1 | 6/2013 | Kwan et al. | |
| 2013/0227550 A1 | 8/2013 | Weinstein et al. | |
| 2013/0332983 A1 | 12/2013 | Koorevaar et al. | |
| 2013/0343399 A1* | 12/2013 | Kandula et al. | 370/412 |
| 2014/0013328 A1 | 1/2014 | Diab et al. | |
| 2014/0068602 A1 | 3/2014 | Gember et al. | |
| 2014/0082616 A1* | 3/2014 | Kurita | 718/1 |
| 2014/0108676 A1* | 4/2014 | Fan | 709/250 |
| 2014/0115578 A1 | 4/2014 | Cooper et al. | |
| 2014/0143467 A1 | 5/2014 | Thakkar | |
| 2014/0310418 A1* | 10/2014 | Sorenson et al. | 709/226 |
| 2014/0331221 A1 | 11/2014 | Dong et al. | |
| 2014/0369194 A1* | 12/2014 | Friedman | H04L 47/32 370/235 |
| 2015/0055456 A1 | 2/2015 | Agarwal et al. | |
| 2015/0055457 A1 | 2/2015 | Agarwal et al. | |
| 2015/0055467 A1 | 2/2015 | Agarwal et al. | |
| 2016/0248671 A1* | 8/2016 | Arad | H04L 49/358 |

FOREIGN PATENT DOCUMENTS

| | | |
|---|---|---|
| JP | 2012-186788 | 9/2012 |
| JP | 2013-530573 | 7/2013 |
| WO | WO 2008/095010 | 8/2008 |

OTHER PUBLICATIONS

Updated portions of prosecution history of EP14180347.8, dated Sep. 4, 2015, VMware, Inc.
Author Unknown, "Enabling Service Chaining on Cisco Nexus 1000V Series," Month Unknown, 2012, 25 pages, CISCO.
Guichard, J., et al., "Network Service Chaining Problem Statement; draft-quinn-nsc-problem-statement-00.txt," Jun. 13, 2013, pp. 1-14, Cisco Systems, Inc.
Joseph, Dilip Antony, et al., "A Policy-aware Switching Layer for Date Centers," Jun. 24, 2008, 26 pages, Electrical Engineering and Computer Sciences, University of California, Berkeley, CA, USA.
Pfaff, B., et al., "The Open vSwitch Database Management Protocol," Aug. 20, 2012, 34 pages, Nicira, Inc. available at http://tools.ietf.org/html/draft-pfaff-ovsdb-proto-00.
Sekar, Vyas, et al., "Design and Implementation of a Consolidated Middlebox Architecture," In Proc. of NSDI, Month Unknown, 2012, 14 pages.
Sherry, Justine, et al., "Making Middleboxes Someone Else's Problem: Network Processing as a Cloud Service," In Proc. of SIGCOMM, Aug. 13-17, 2012, 12 pages, Helsinki, Finland.
Communication pursuant to Article 94(3) EPC, European Patent Office, dated Jan. 8, 2016, 6 pages, Application No. 14 180 347.8-1862, Ref. P31489EP1/IMR.

* cited by examiner

TRAFFIC AND LOAD AWARE DYNAMIC QUEUE MANAGEMENT

CROSS REFERENCING TO THE RELATED APPLICATIONS

This application claims priority to U.S. Provisional Application No. 61/870,201, filed Aug. 26, 2013, the entirety of which is incorporated herein.

BACKGROUND

In the last few years, queue management systems have been proposed for distributing incoming and outgoing traffic to and from a host through a network interface card (NIC) with multiple queues. FIG. 1 illustrates one such system. Specifically, it illustrates (1) multiple virtual machines (VMs) 102 that execute on a host computer (not shown), and (2) a NIC 100 that has multiple queues. As shown in this figure, each queue has a receive side set 104 of buffers and a transmit side set 106 of buffers to handle respectively incoming and outgoing traffic. The system has four types of queues, which are: a default queue 105, several non-default queues 115, LRO (large receive offload) queues 120 and RSS (receive side scaling) queues 125. The latter two types of queues are specialty queues tied to specific hardware LRO and RSS functionalities supported by the NIC.

The queue management system of FIG. 1 distributes traffic to and from the virtual machines (VMs) across multiple queues. In this system, all VMs start out in a default queue 105. A VM is moved out from the default queue to a non-default queue 115 whenever its traffic exceeds a given threshold. When moving a VM out from the default queue, this implementation always moves a VM to the least-loaded non-default queue regardless of the requirements of the VM. This causes three major problems.

First, since the current implementation chooses a non-default queue without considering the VM's traffic type, VMs with special requirements might be interfered by other VMs. For example, if a special VM that transmits and receives latency-sensitive traffic, shares the same queue with several other VMs running less latency-sensitive, throughput-intensive workloads, the latency and jitter of the special VM will certainly be affected. Queue 150 in FIG. 1 is an example of an overloaded queue that has traffic for both a low latency required (LLR) VM 152 and several high latency tolerating (HLT) VMs. In this situation, the LLR VM 152 might not be able to send and receive traffic within the maximum latency that it can tolerate because of the traffic of the various HLT VMs.

The second problem with this implementation is that it statically assigns fixed number of queues to one of the three different non-default pools of queues, which are non-default queues 115, LRO (large receive offload) queues 120 and RSS (receive side scaling) queues 125. In this approach, each pool has all of its queues assigned and allocated during the driver initialization. By default, each pool will get the same amount of queues, even if the pool is in fact not in use. This results in a performance issue when a pool needs more queues to sustain the traffic as the overloaded pool will never be able to take over free queues from other pools and thus can never grow further, even if the system has the capacity.

The third problem is that queue assignment for a VM is one-time, i.e., once the VM moves to a queue, it will never be moved to another non-default queue. This causes two issues. First, because the assignment is one-time, if a VM later needs more resources to grow the traffic, it might end up being limited by the utilization of its current queue. Even if there is a less-busy queue that has more room to grow, this prior approach does not allow the VM to take the chance. In addition, this approach tries to statically keep all queues busy, even if not so many queues are needed to serve the traffic. Since this approach has a dedicated kernel context for each queue, having unnecessary number of active queues results in more active contexts. These active contexts will inevitably halt other contexts (such as vCPU) when an interrupt arrives. Therefore, the host ends up spending more cycles doing context switches, which hurts VM consolidation ratio.

BRIEF SUMMARY

Some embodiments provide a queue management system that efficiently and dynamically manages multiple queues that process traffic to and from multiple virtual machines (VMs) executing on a host. This system manages the queues by (1) breaking up the queues into different priority pools with the higher priority pools reserved for particular types of traffic or VM (e.g., traffic for VMs that need low latency), (2) dynamically adjusting the number of queues in each pool (i.e., dynamically adjusting the size of the pools), (3) dynamically reassigning a VM to a new queue based on one or more optimization criteria (e.g., criteria relating to the underutilization or overutilization of the queue).

In some embodiments, the queue management system initially has a newly initialized VM in an unassigned, default pool. When a VM's traffic exceeds a pre-set threshold, the system determines if there is a pool matching the VM's traffic requirement, and if so, assigns the VM to that pool. If there is no matching pool, the system creates a new pool and assigns the VM to that pool. In situations where there are no free queues for creating new pools, the queue management system preempts one or more assigned queues (i.e., queues assigned to previously created pools) and assigns the preempted queue(s) to the newly created pool. This preemption rebalances queues amongst existing pools to free up one or more queue(s) for the new pool. In some embodiments, the rebalancing process across pools can be controlled by resource allocation criteria such as minimum and maximum size of a pool, relative priorities of the pools, etc.

Also, the queue management system can rebalance traffic within a pool based on one or more criteria, such as CPU load of the associated management thread (e.g., kernel context), traffic type, traffic load, other real-time load metrics of the queues, etc. In some embodiments, the system uses different rebalancing criteria for different pools. For instance, the system might want to pack VMs on a few queues in some pools, while for other pools, it might want to distribute VMs across the queues as much as possible. In some embodiments, the queue management system has a load balancer that performs the rebalancing process periodically and/or on special events.

When the VM's traffic falls below a threshold, the queue management system of some embodiments moves the VM back to a default queue. When the VM is the last VM that is using a queue in a non-default queue, then the system moves the last-used queue to the pool of free queues, so that it can later be reallocated to any pools.

In addition to the VM data traffic or instead of VM data traffic, the queue management system of some embodiments dynamically defines pools, uniquely manages each pool, dynamically modifies the queues within the pools, and dynamically re-assigns data traffic to and from non-VM addressable nodes (e.g., source end nodes or destination end nodes) that execute on a host. Specifically, the system of some embodiments monitors data traffic for a set of VM and/or non-VM addressable nodes (e.g., data end nodes) through the NIC of a host device. Based on this monitoring, the system specifies a pool for at least a set of the addressable nodes, and assigns a set of the queues to the pool. The system then uses destination or source media access control (MAC) filter, or five-tuple filtering, to direct to the assigned set of queues the data traffic that is received by, or transmitted from, the host device for the set of non-VM addressable nodes.

Alternatively, or conjunctively, based on the monitoring, the system of some embodiments can modify the set of queues assigned to a pool for the set of the VM and non-VM addressable nodes. As mentioned above, examples of such modifications include adding or removing a queue from the pool when one or more of the queues of the pool are overutilized or underutilized. In some embodiments, the system adds a queue to the pool by preempting a queue from another pool, e.g., by using one of the above-described preemption methodologies.

Also, alternatively or conjunctively to the above-described operations, the system can re-assign the data traffic for a VM or a non-VM addressable node (e.g., data end node) from a first queue in the pool to a second queue in the pool, based on the monitoring. For instance, based on the monitoring, the system of some embodiments detects that the traffic for the VM or non-VM addressable node through the first queue falls below a minimum threshold amount of traffic (e.g., for a duration of time). Because of this underutilization, the system switches this traffic to the second queue. Before making this switch, the system of some embodiments determines that the traffic through the second queue does not exceed a maximum threshold amount of traffic.

Based on the monitoring, the system of some embodiments detects that the traffic through the first queue exceeds a maximum threshold amount of traffic (e.g., for a duration of time). Because of this overutilization, the system switches the traffic for a VM or a non-VM addressable node (e.g., data end node) from the first queue to the second queue. Again, before making this switch, the system of some embodiments determines that the traffic through the second queue does not exceed a maximum threshold amount of traffic.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

Figure 1:
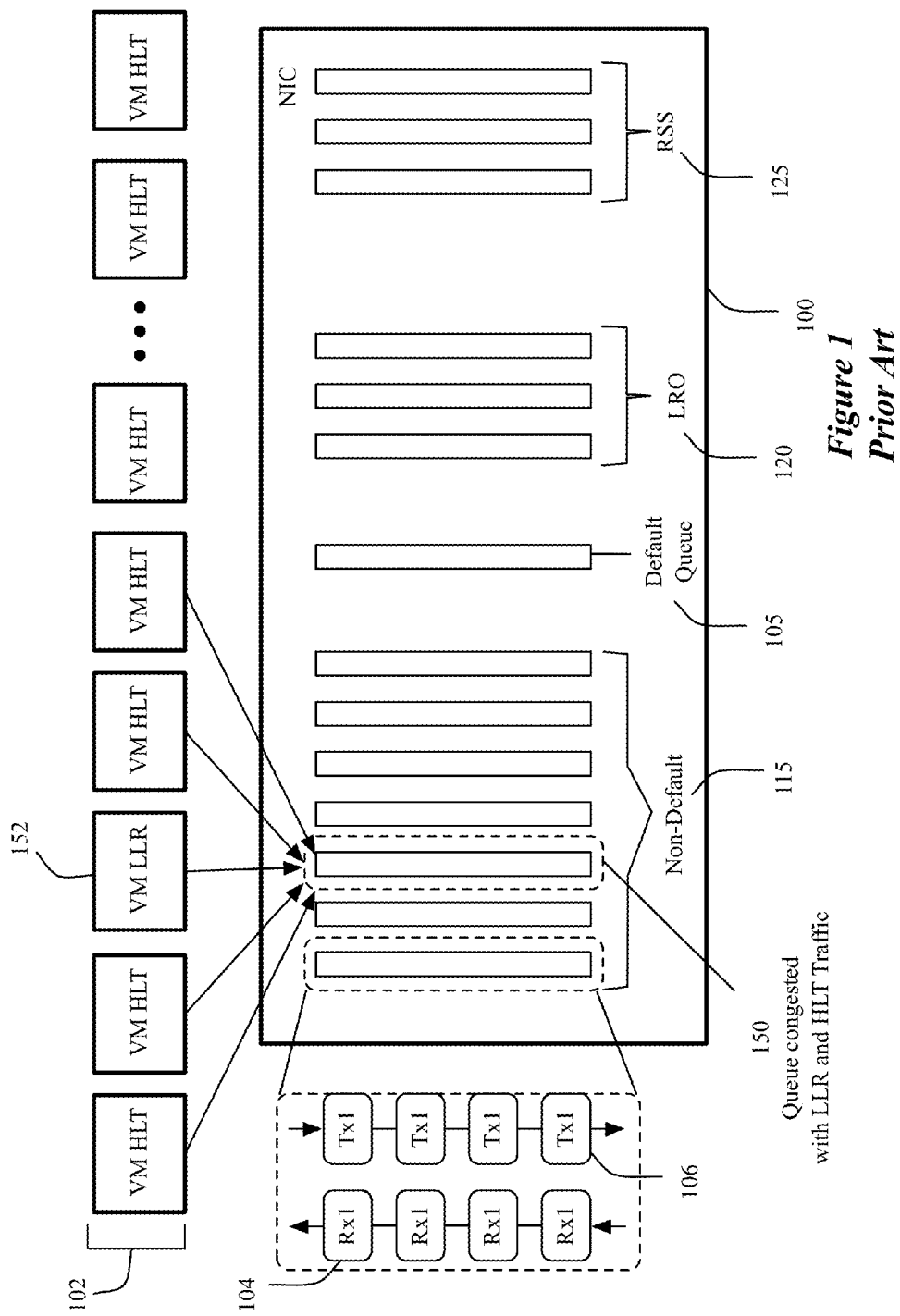
FIG. 1 is an example of an overloaded queue that has traffic for both a low latency required (LLR) VM and several high latency tolerating (HLT) VMs.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a queue management system that efficiently and dynamically manages multiple queues that process traffic to and from multiple virtual machines (VMs) executing on a host. This system manages the queues by (1) breaking up the queues into different priority pools with the higher priority pools reserved for particular types of traffic or VMs (e.g., traffic for VMs that need low latency), (2) dynamically adjusting the number of queues in each pool (i.e., dynamically adjusting the size of the pools), (3) dynamically reassigning a VM to a new queue based on one or more optimization criteria (e.g., criteria relating to the underutilization or overutilization of the queue).

In some embodiments, the queue management system groups the queues into four types of pools. These are:
(1) a default pool that includes in some embodiments one default queue that is the initial queue for some or all of the VMs upon their initialization (in other embodiments, the default pool includes more than one default queue);

(2) a free pool that includes all of the unused queues (i.e., the queues that are not assigned to traffic to or from any VM);

(3) hardware-feature pool that includes queues associated with a particular hardware feature, such as LRO and RSS;

(4) VM-requirement pools that include queues that serve VMs with different kinds of requirements, such as low latency required (LLR) VMs and high latency tolerated (HLT) VMs.

In some of these embodiments, the queue management system initially has all the queues in an unassigned, free pool, except for one default queue that is in the default pool. Some embodiments do not allocate the default queue until the first VM is initialized, while other embodiments specify the default queue even before the first VM is initialized.

When a VM's traffic exceeds a pre-set threshold, the system determines if there is a pool matching VM's traffic requirement (e.g., if there is an LLR pool for an LLR VM that is exceeding its threshold), and if so, the system assigns the VM to that pool. If there is no matching pool, the system creates a new pool and assigns the VM to that pool. When there are no free queues for creating new pools, the queue management system preempts one or more assigned queues (i.e., queues assigned to previously specified pools) and assigns the preempted queue(s) to the newly created pool. This preemption rebalances queues amongst existing pools to free up one or more queue(s) for the new pool. In some embodiments, the rebalancing process across pools is based on one or more resource allocation criteria, such as minimum and maximum size of a pool, relative priorities of the pools, etc.

In addition to balancing queues across pools, the queue management system of some embodiments rebalances traffic within a pool. This system uses different criteria in different embodiments to rebalance traffic within a pool. Examples of such criteria include CPU load of the associated management thread, traffic type, traffic load, other real-time load metrics of the queues, etc. In some embodiments, the system uses different rebalancing criteria for different pools. For instance, the system tries to pack VMs on fewer queues in some pools, while for other pools, it tries to distribute VMs across the queues as much as possible. In some embodiments, the queue management system has a load balancer that performs the rebalancing process periodically and/or on special events.

When the VM's traffic falls below a threshold, the queue management system of some embodiments moves the VM back to a default queue. When the VM is the last VM that is using a queue in a non-default queue, then the last-used queue is moved to the free pool of unassigned queues, so that it can later be reallocated to any pool. Thus, under this approach, a queue is assigned to one of the non-default pools as soon as the queue gets assigned a VM, and it is assigned back to the free pool as soon as its last VM is reassigned or is shut off.

In addition to the VM data traffic or instead of VM data traffic, the queue management system of some embodiments dynamically defines pools, uniquely manages each pool, dynamically modifies the queues within the pools, and dynamically re-assigns data traffic to and from non-VM addressable nodes (e.g., source end nodes or destination end nodes) that execute on a host. Performing these operations for VMs is first described below. This discussion is then followed by a discussion of performing these operations for non-VM addressable nodes.

I. Different Pools for VMs with Different Requirements

Figure 2:
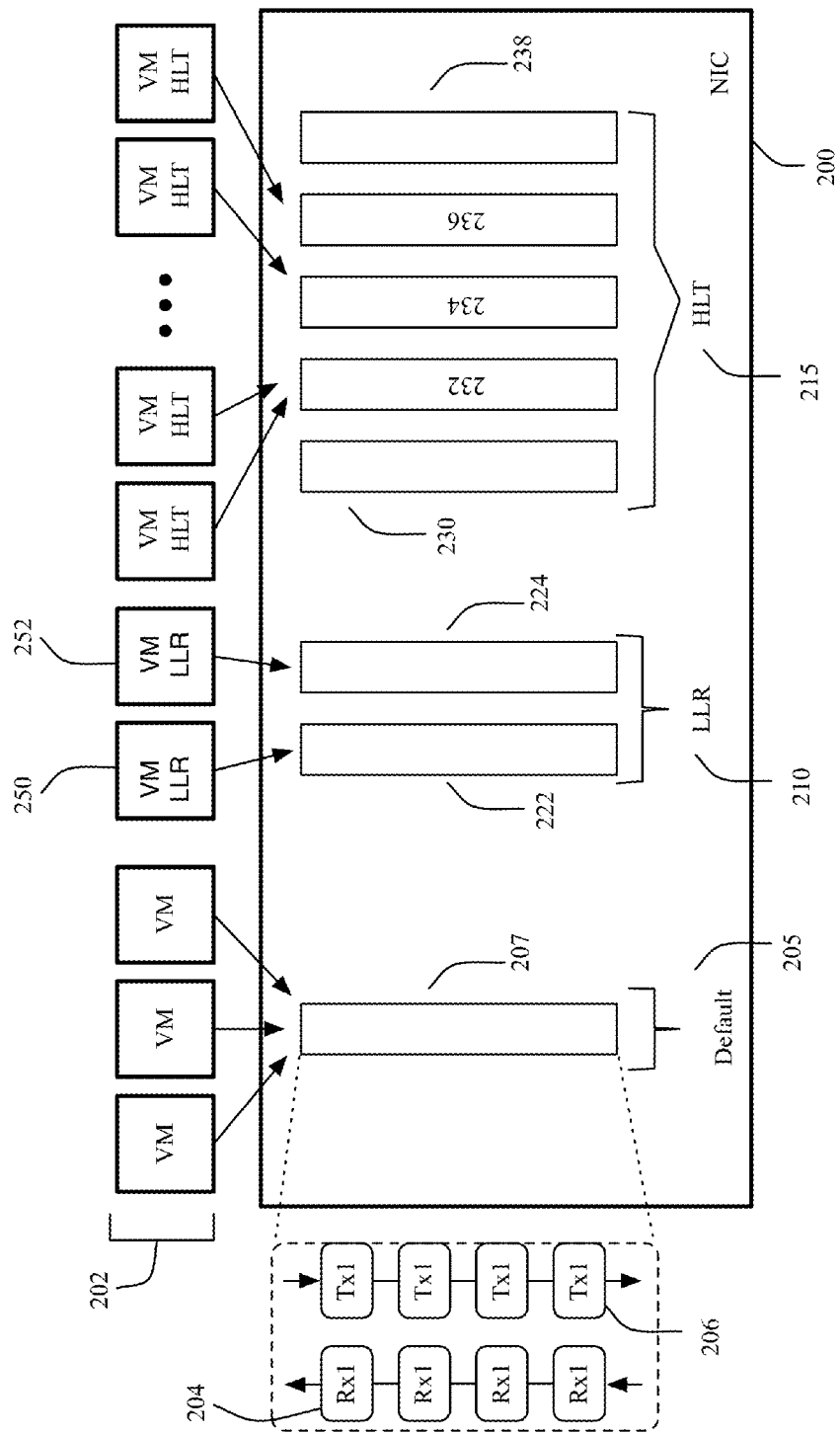
FIG. 2 illustrates an example of the conceptual grouping of the queues into two priority pools based on the type of traffic or VM requirements.

As mentioned above, the queue management system of some embodiments breaks up the queues into different priority pools with the higher priority pools reserved for particular types of traffic or VMs (e.g., traffic for VMs that need low latency). FIG. 2 illustrates an example of the conceptual grouping of the queues into two priority pools 210 and 215 based on the type of traffic or VM requirements. Specifically, it illustrates (1) a physical NIC 200 with multiple queues, and (2) multiple virtual machines (VMs) 202 with different requirements. The VMs execute on a host computer (not shown). The traffic to and from these VMs is distributed across the various queues of the NIC. As shown in this figure, each queue has a receive-side set 204 of buffers and a transmit-side set 206 of buffers to handle respectively incoming and outgoing traffic. In some embodiments, one core of a multi-core processor manages each queue. Accordingly, in the example illustrated in FIG. 2, eight cores would manage the eight queues of the NIC.

In some NICs, each receive side set of buffers 204 is its own standalone queue in the NIC. Likewise, in these NICs, each transmit-side set of buffers 206 is its own standalone queue in the NIC. However, even though the receive side queues are separate and independent from the transmit side queues in these NIC, the queue management system of some embodiments pairs one receive side queue with one transmit side queue so that the queue pair can be used as one queue construct for a VM. Other embodiments, however, do not "pair" the queues. Specifically, these other embodiments do not require all the VMs that use a receive side queue to use the same transmit side queue; two VM can use the same receive side queue, but different transmit side queues. However, in order to keep the illustrations simple, each queue that is shown in FIGS. 3-6 and 10-15 is a queue pair that includes a receive side queue paired with a transmit side queue.

In FIG. 2, the queue management system has grouped the queues of a physical NIC 200 into three different types of pools. These are: (1) a default pool 205, (2) an LLR pool 210, and (3) a HLT pool 215. As shown in FIG. 2, the default pool 205 in some embodiments includes only one default queue. In other embodiments, it includes more than one default queue. A default queue serves the traffic of the VMs that are not assigned to a queue of a non-default pool. When there is only one default queue (such as default queue 207), the "default" queue serves all the VMs that are not assigned to a non-default pool. In some embodiments, the default queue 207 serves all the low-traffic VMs, i.e., serves any VM that has less traffic than a pre-set traffic threshold. These VMs have too little traffic to merit being placed in a non-default queue.

In some ways, the default queue 207 can be viewed as not belonging to any pool, since from hardware point of view, this queue just serves all the VMs that do not have a matching filters that direct their routing of incoming and outgoing traffic to another queue. The queue management system of some embodiments starts each VM on the default queue until the VM's traffic exceeds the threshold. Once the VM's traffic exceeds the threshold, the system selects a non-default queue for the VM, and then directs the PNIC to allocate a filter for the VM's inbound traffic, and the virtualization layer to allocate filter for the VM's outbound traffic. In some embodiments, the filter on the outbound traffic is based on the source MAC address, while the filter on the inbound traffic is based on the destination MAC address. These filters direct modules in the PNIC and the virtualization layer to route incoming and outgoing traffic to the selected queue. It should be noted that the filters can be based on other identifiers. For instance, the filter on the outbound traffic in some embodiments is based on the software forwarding element port ID.

The allocation of the filters allows a queue that is conceptually assigned to a non-default pool to serve the traffic of a VM. In other words, by specifying the filter, the system links a VM's traffic with a queue. Moreover, by associating a queue with a conceptual "pool" that it maintains, the queue management system can apply different management processes to differently manage the queues in the different pools and thereby to manage the different VMs with the different requirements. This is further described below in Section II.

When the pool does not exist for a queue that is to be allocated to the pool, the queue management system first defines the pool and then allocates the queue to it, as further described below. The LLR and HLT pools 210 and 215 are two pools that are created to address specific VM requirements. The LLR pool 210 includes the queues that are meant to serve the LLR VMs while the HLT pool 215 includes the queues that are meant to serve the HLT VMs. As shown in FIG. 2, the LLR VMs 250 and 252 send and receive their packets through the LLR queues 222 and 224 of the LLR pool 210, while the HLT VMs 260 send and receive their packets through the HLT queues 230-238 of the HLT pool 215.

In some embodiments, the queue management system conceptually defines these pools by particularly allocating the filters (on both the transmit and receive sides), so that the LLR VM traffic goes through one set of the queues, while the HLT VMs go through another set of queues. For the LLR VMs, the queue management system of some embodiments optimizes the allocation of the LLR queues to ensure that the VM traffic is as spread out as possible across the LLR queues so that the LLR VMs are minimally impacted by traffic of other VMs. On the other hand, for the HLT VMs, the system of some embodiments optimizes the allocation of the HLT queues by trying to reduce the number of HLT queues that are used by the HLT VMs, in order to keep more of the free queues available for new allocations.

By separating the queues for the LLR VMs from the queues for the HLT VMs, the queue management system of some embodiments allows the traffic to and from the LLR VMs to go through the less congested LLR queues. As such, the LLR VMs can have lower latency in sending and receiving their packets.

Even though the example illustrated in FIG. 2 shows three types of pools, one of ordinary skill will realize that other embodiments use fewer or additional pools. For instance, instead of providing both LLR and HLT pools, the queue management system of some embodiments only defines an LLR pool, and directs all the HLT traffic through the default pool. To handle all such HLT traffic, the queue management system of some embodiments defines multiple queues in the default pool.

Figure 3:
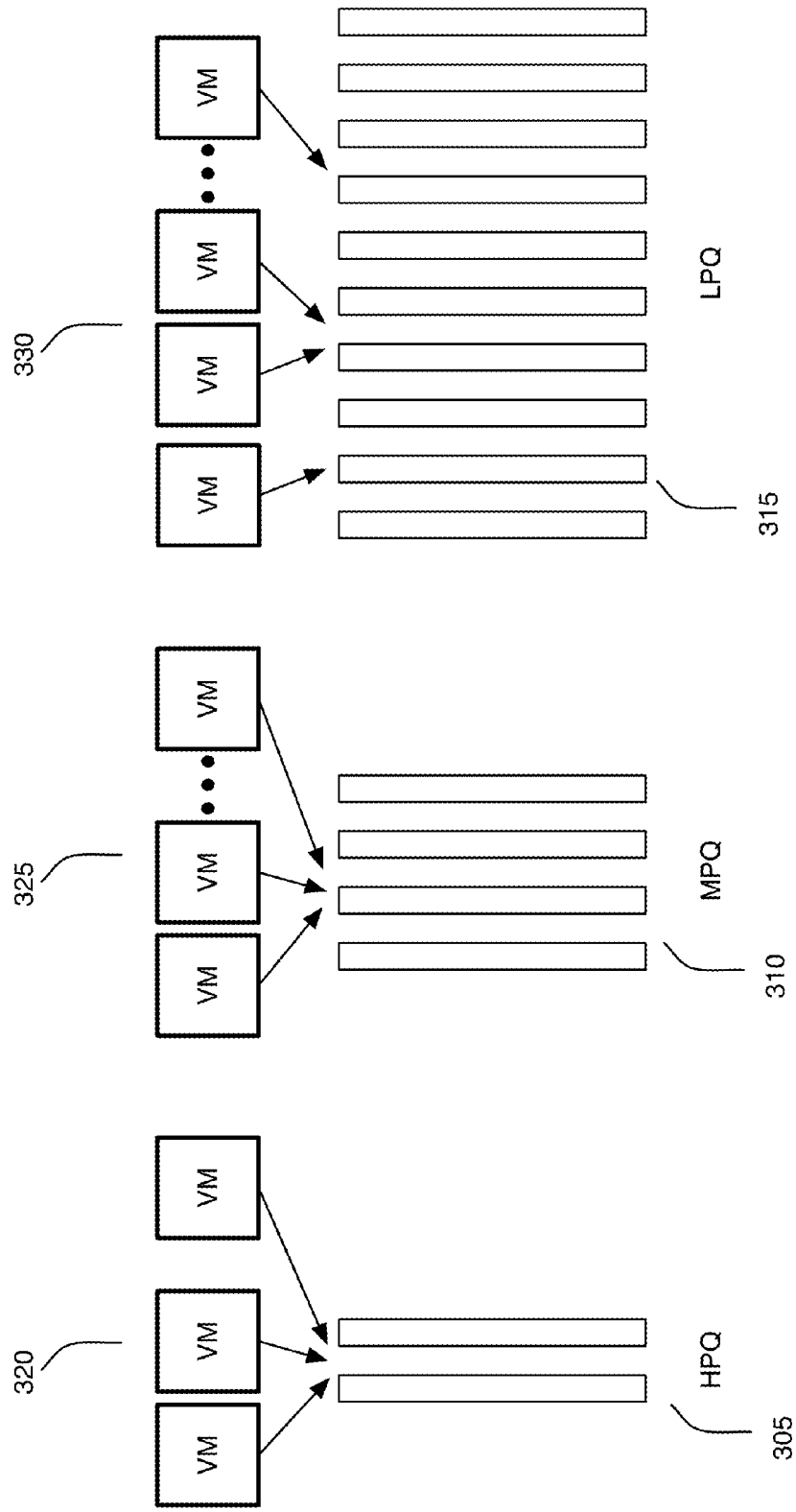
FIG. 3 illustrates an example of three priority pools for three different types of VMs.

In addition to the LLR pool and/or HLT pool, the queue management system of some embodiments also defines LRO and RSS pools (like those illustrated in FIG. 1) to support LRO and RSS hardware features of the NIC. Also, the LLR and HLT pools are examples of pools that are specified based on VM requirements, with the LLR being a higher priority pool than the HLT as the LLR is intended for LLR VM traffic. In other embodiments, the queue management system defines more than two priority pools to handle more than two types of VM requirements. For instance, FIG. 3 illustrates an example of three priority pools for three different types of VMs. The pools include a high pool 305, a medium pool 310 and a low pool 315, and their queues respectively handle traffic for high priority (HP) VMs 320, medium priority (MP) VMs 325 and low priority (LP) VMs 330. In some embodiments, a higher priority pools may have fewer VMs and/or less overall traffic per queue, than a lower priority pool.

Figure 4:
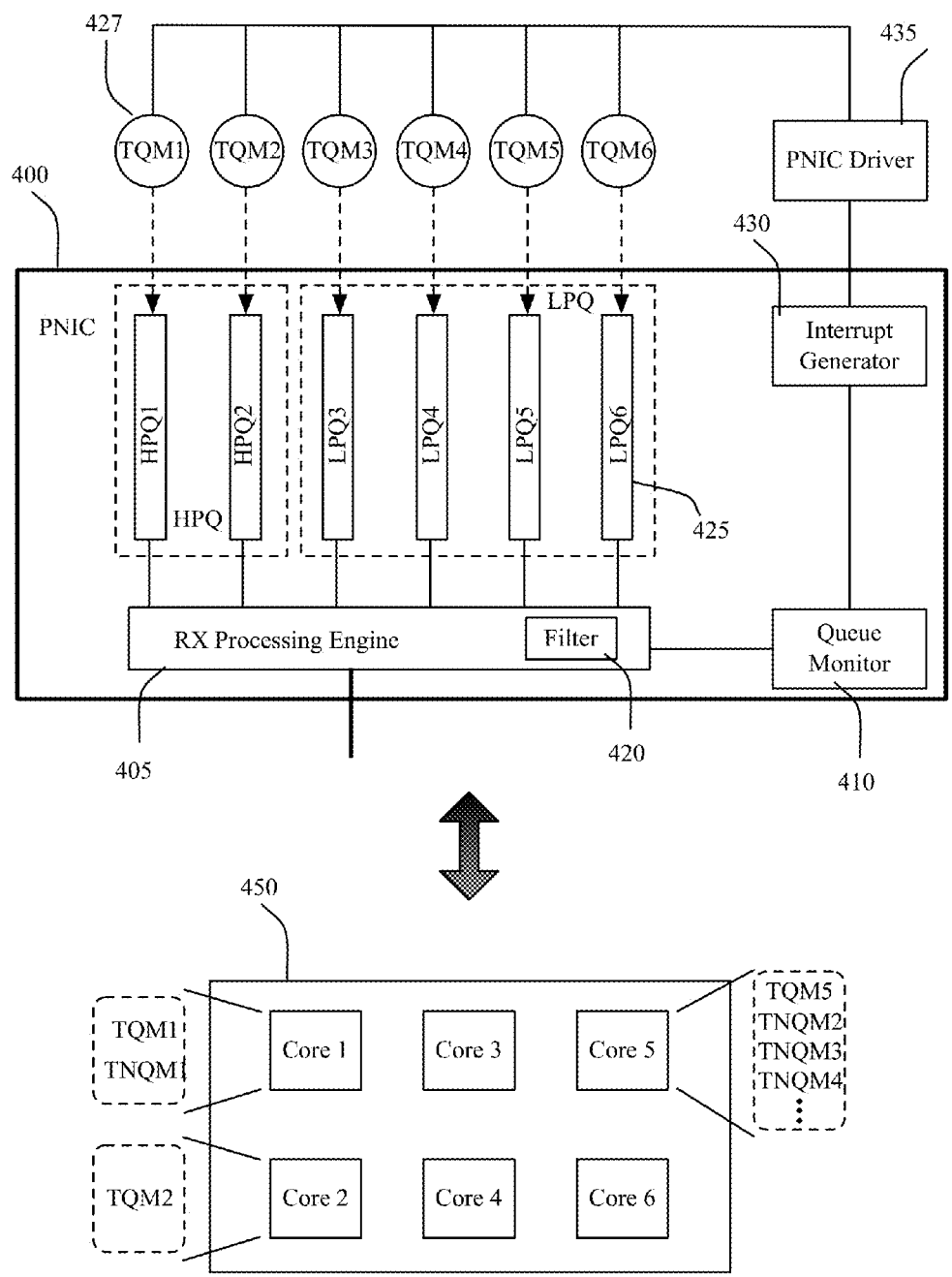
FIG. 4 illustrates threads in the network virtualization layer (NVL) that are responsible for the queues in the PNIC, along with the interrupt generation architecture of some embodiments of the invention.

Also, instead of defining an LLR or an HLT pool or in conjunction with defining such a pool, the queue management system of some embodiments defines a high interrupt (HI) pool or a low interrupt (LI) pool. In this context, interrupts refer to signals generated by the PNIC to threads in the network virtualization layer (NVL) that are responsible for the queues in the PNIC. FIG. 4 illustrates such threads along with the interrupt generation architecture of some embodiments of the invention. In some embodiments, a thread is a process that is initiated to perform a set of tasks (e.g., to manage receive- or transmit-side modules in a network stack for a VM). Also, in some embodiments, different threads can execute as independent processes on different threads of a multi-threaded processor, and/or on different cores of a multi-core processor.

FIG. 4 shows a PNIC 400 that includes (1) several queues for receiving incoming traffic that needs to be relayed to the VMs, (2) a receive-side (RX) processing engine 405 for managing the assignment of incoming traffic to the queue, (3) a queue monitor 410 for monitoring the status of the queues, and (4) an interrupt generator 430 for generating interrupts that direct receive-side threads of the NVL to retrieve data stored in the queues. The RX processing engine includes a MAC filter 420, which as described above and further described below is used to pair a VM's incoming traffic to a queue.

FIG. 4 also shows a receive-side (RX) thread 427 for each queue in the PNIC. In some embodiments, the threads 427 are part of a network virtualization layer that manages traffic to and from the virtual machines through the PNIC. The queue management system is part of the network virtualization layer in some embodiments.

Each thread manages its associated queue. Each time a queue is being filled up with received packets, the PNIC's queue monitor 410 detects this and directs the PNIC's interrupt generator 430 to generate an interrupt for the core that executes the queue's thread 425, in order to direct the thread to retrieve the packets from the queue. The generator sends this interrupt through an API of a PNIC driver 435, which in turn generates an interrupt for the core. Each time a queue's thread is invoked for this operation, the core that manages the queue and executes its thread has to interrupt another task that it is performing, in order to execute the thread so that it can retrieve the packets from the queue. Such interruptions affect the processor's operational efficiency.

Accordingly, to increase the processor's operational efficiency and/or reduce latency for critical VMs, the queue management system of some embodiments defines an HI pool or an LI pool. A HI pool is a pool that contains queues that carry traffic that needs to be delivered with lower latency, while a LI pool is a pool that contains queues that carry traffic that can tolerate more latency.

In some embodiments, a thread that manages a HI pool will receive more interrupts than a thread that manages a LI pool, and as such it is operated in some embodiments by a processor core that has less load on it than the core that operates a LI pool. Specifically, to account for the desired low latency of LLR VMs, the queue management system of some embodiments designates a queue that handles traffic for a LLR VM as a queue in a HI pool. Based on this designation, it then can perform a variety of tasks to optimize the management of this queue and the management of the core that executes this queue's thread. For instance, the queue management system in some embodiments reduces the number of VMs that are assigned to this HI queue or only assigns to this queue VMs that also are critical and need as low a latency. In conjunction or instead of this, the queue management system of some embodiments can also direct the processor's scheduler to reduce the load on the core that executes the thread for this HI queue, and/or can direct the PNIC to generate interrupts sooner for this queue.

FIG. 4 illustrates an example of reducing the load on a core that executes a HI pool. Specifically, in this example, queue management threads TQM1 and TQM2 are for managing high priority queues HPQ1 and HPQ2, which are HI queues. These threads are assigned to cores 1 and 2 of a multicore processor 450. As shown in FIG. 4, the load on these cores are relatively light, as core 2 only executes thread TQM2, while core 1 executes thread TQM1 and a non-queue management thread TNQM1. The loads on these cores is in contrast to the load on core 5, which executes the queue management thread TQM5 (for the low priority queue 5 (LPQ5)) but also executes three other non-queue management threads TNQM2-TNQM4.

To account for the higher acceptable latency of HLT VMs, the queue management system of some embodiments designates a queue that handles traffic for an HLT VM as a LPQ in a LI pool. Based on this designation, it then can perform a variety of tasks to optimize the management of this queue and the management of the core that executes this queue's thread. For instance, the queue management system in some embodiments may assign more VMs to this queue. In conjunction or instead of this, the queue management system of some embodiments also notifies the processor's scheduler that it can schedule additional threads onto the core that executes the thread for this queue, and/or directs the PNIC to generate less interrupts for this queue (i.e., to allow this queue to fill up more before generating the interrupts).

The HI pool and/or LI pool designations are used in conjunction with the LLR pool and/or HLT pool designations in some embodiments, while they are used in place of the LLR pool and/or HLT pool designations in other embodiments. A queue may be designated as both LLR and HI queue in some embodiments. Alternatively, an LLR VM might be included with HLT VMs in a queue, but the queue might be designated as a HI queue, so that its core is not as heavily loaded and can therefore be interrupted frequently to empty out the queue.

II. Queue Management System

The queue management system of some embodiments will now be described by reference to FIG. 5. This system 500 breaks up the queues into different priority pools with the higher priority pools reserved for particular types of traffic or VMs (e.g., traffic for VMs that need low latency). It also dynamically adjusts the queues in each pool (i.e., dynamically adjusts the size of the pools), and dynamically reassigns a VM to a new queue in its pool based on one or more optimization criteria (e.g., criteria relating to the underutilization or overutilization of the queue).

Figure 5:
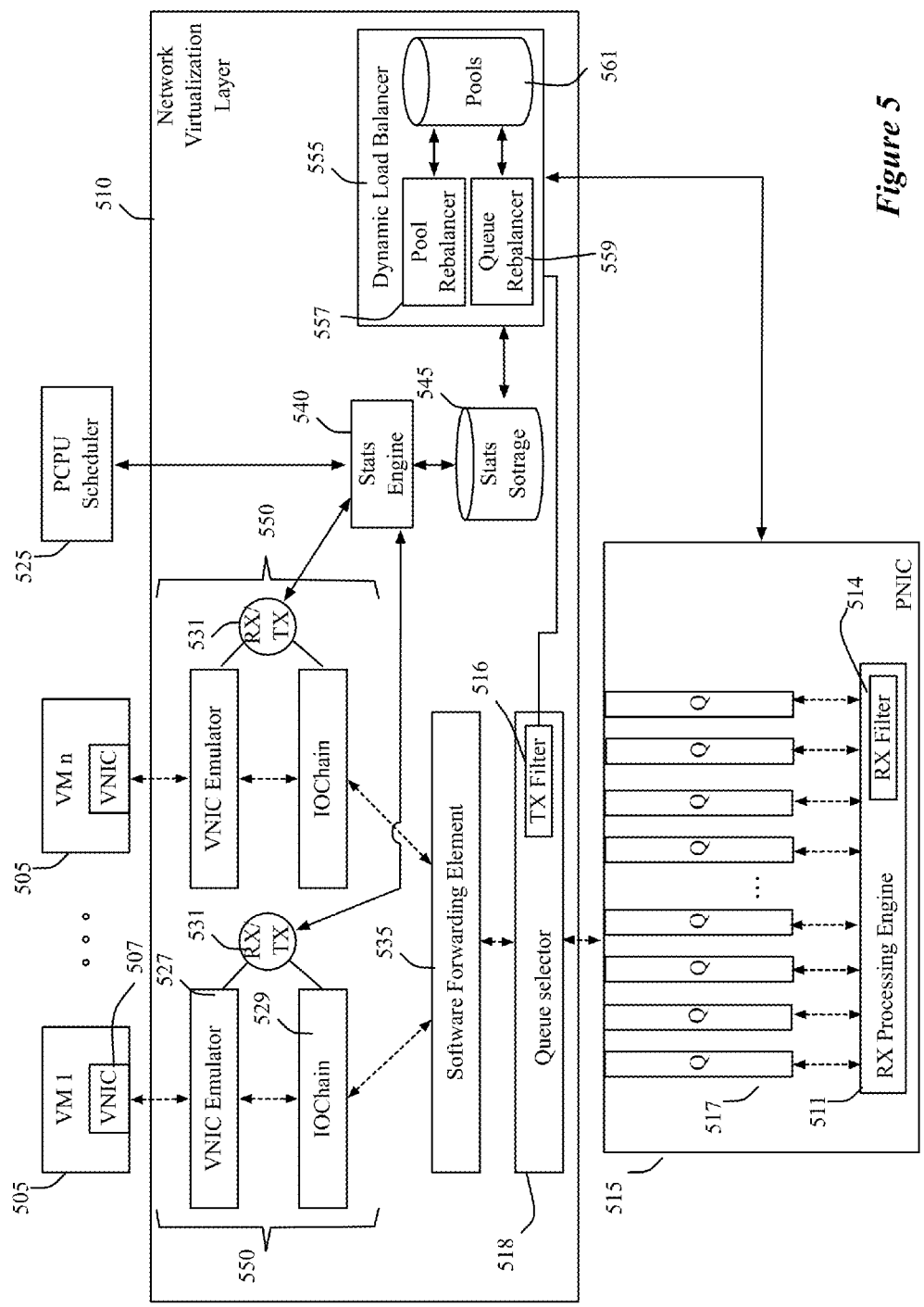
FIG. 5 illustrates the queue management system of some embodiments.

FIG. 5 illustrates (1) several VMs 505 that are executing on a host, (2) the host's physical NIC 515 that is shared by the VMs, (3) a network virtualization layer 510 that executes on the host and that facilitates traffic to and from the VMs through the shared PNIC, and (4) a physical processor scheduler 525 (also called physical CPU or PCPU) that is a kernel scheduler that directs the processors as to when and where to run one of the threads (also called contexts).

The PNIC 515 has several queues 517. These queues include receive side queues for storing incoming data received by the host and transmit side queues for storing outgoing data transmitted from the VMs. In some embodiments, each queue includes a set of buffers for storing incoming or outgoing data. In some embodiments, the receive side queues are separate and independent from the transmit side queues, but the virtualization layer pairs one receive side queue with one transmit side queue so that the queue pair can be used as one queue construct for a VM. Other embodiments, however, do not "pair" the queues. In other words, these embodiments do not require all the VMs that use a receive side queue to use the same transmit side queue; two VM can use the same receive side queue, but different transmit side queues.

The PNIC also has a receive (RX) side processing engine 511 for receiving incoming packets from a wired or wireless link. The RX processing engine has a MAC filter 514, which is configured to associate each VM's incoming traffic to one queue pair based on the destination MAC. The virtualization layer maintains an analogous filter 516 for outgoing packets, and a queue selector 518 in this layer uses the data in this filter to configure each VM's outgoing traffic to use the same queue pair as the incoming traffic. In some embodiments, the filter 516 specifies a VM in terms of the VM's or its VNIC's source MAC address, while in other embodiments it specifies a VM in terms of the port ID of a software forwarding element to which the VM's VNIC connects. In some embodiments, the PNIC also includes circuitry for monitoring the queues and generating interrupts, as described above by reference to FIG. 4.

The VMs executes on top of a hypervisor (not shown), which, in some embodiments, includes the network virtualization layer 510. FIG. 5 shows each VM to include a virtual NIC (VNIC) 507. It also shows the network virtualization layer 510 to include (1) one network stack 550 for each VM, (2) a software forwarding element 535, (3) a statistics-gathering engine 540, (4) a statistics storage 545, and (5) a dynamic load balancer 555. Each network stack includes a VNIC emulator 527, and an I/O chain 529. Each network stack is managed by receive/transmit threads 531.

Each network stack connects to its VM through its VNIC emulator and connects to the software forwarding element 535, which is shared by all the network stacks of all the VMs. Each network stack connects to the software forwarding element through a port (not shown) of the switch. In some embodiments, the software forwarding element maintains a single port for each VNIC. The software forwarding element 535 performs packet-processing operations to forward packets that it receives on one of its ports to another one of its ports, or to one of the ports of another software forwarding element that executes on another host. For example, in some embodiments, the software forwarding element tries to use data in the packet (e.g., data in the packet header) to match a packet to flow based rules, and upon finding a match, performs the action specified by the matching rule.

In some embodiments, software forwarding elements executing on different host devices (e.g., different computers) are configured to implement different logical forwarding elements (LFEs) for different logical networks of different tenants, users, departments, etc. that use the same shared compute and networking resources. For instance, two software forwarding elements executing on two host devices can perform L2 switch functionality. Each of these software switches can in part implement two different logical L2 switches, with each logical L2 switch connecting the VMs of one entity. In some embodiments, the software forwarding elements provide L3 routing functionality, and can be configured to implement different logical routers with the software L3 routers executing on other hosts.

In the virtualization field, some refer to software switches as virtual switches as these are software elements. However, in this document, the software forwarding elements are referred to as physical forwarding elements (PFEs), in order to distinguish them from logical forwarding elements, which are logical constructs that are not tied to the physical world. In other words, the software forwarding elements are referred to as PFEs because they exist and operate in the physical world, whereas logical forwarding elements are simply a logical representation of a forwarding element that is presented to a user. Examples of logical forwarding elements are logical forwarding elements, such as logical switches, logical routers, etc. U.S. patent application Ser. No. 14/070,360 provides additional examples of PFEs and LFEs, and is incorporated herein by reference.

The software forwarding element 535 connects to the PNIC to send outgoing packets and to receive incoming packets. In some embodiments, the software forwarding element is defined to include a port through which it connects to the PNIC to send and receive packets. As mentioned above, the queue selector 518 is interposed between the software forwarding element 535 and the PNIC in some embodiments. The queue selector selects the receive side queues for retrieving incoming packets and transmit side queues for supplying outgoing packets. As mentioned above, the queue selector uses the data in the filter 516 to identify the transmit side queue for supplying a particular VMs outgoing traffic. The selector does not use the data in the filter to select a queue and retrieve its packets for a RX thread of a VM. In some embodiments, the queue selector is part of the receive/transmit threads 531 of the network stacks, as further described below. As such, for these embodiments, the queue selector 518 is a conceptual representation of the queue selection operation that the receive/transmit threads 531 perform in some embodiments.

Each VNIC in the VM is responsible for exchanging packets between the VM and the network virtualization layer through its associated VNIC emulator 527. Each VNIC emulator interacts with NIC drivers in the VMs to send and receive data to and from VMs. In some embodiments, the VNICs are software abstractions of physical NICs implemented by virtual NIC emulators. For instance, the code for requesting and obtaining a connection ID reside in components of virtual NIC emulators in some embodiments. In other words, the VNIC state is implemented and maintained by each VNIC emulator in some embodiments. Virtual devices such as VNICs are software abstractions that are convenient to discuss as though part of VMs, but are actually implemented by virtualization software using emulators. The state of each VM, however, includes the state of its virtual devices, which is controlled and maintained by the underlying virtualization software. Even though FIG. 5 shows one VNIC emulator for each VNIC of each VM, each VNIC emulator may maintain the state for more than one VNIC and/or for more than one VM in some embodiments.

The I/O chain in each network stack includes a series of modules that perform a series of tasks on each packet. As described in the above-incorporated U.S. patent application Ser. No. 14/070,360, two examples of I/O chain modules are an ARP and DHCP proxy modules that resolve ARP and DHCP broadcast messages without resorting to broadcasting these messages. Other examples of the processes performed by the modules in the I/O chain include firewall and traffic tunneling operations. The input/output of the I/O chain goes to one of the ports of the software forwarding element.

In some embodiments, the receive/transmit threads 531 of each network stack 550 are kernel-level threads that manage the modules in the network stack. These threads also manage the PNIC queue 517 that is associated with the stack's VM. Specifically, in some embodiments, the receive side of each queue has a dedicated RX kernel thread to handle interrupts and poll packets from the receive side of the queue. Also, each VM has a dedicated TX kernel thread to handle packets sent from the VM. In some embodiments, each pair of receive/transmit threads are executed by one of the cores of a multi-core processor(s) of the host, as the recommended number of queues in these embodiments equals the numbers of the cores of the multi-core processor(s) of the host. Even through separate receive and transmit threads are used for separately managing the receive and transmit operations of the stack and its associated queue in FIG. 5, one of ordinary skill will realize that in other embodiments one thread is used to perform both of these tasks. Also, in some embodiments, the RX/TX thread(s) may not be tied or as strictly tied to the queues, cores and/or VMs.

As mentioned above, the network virtualization layer also includes the statistics (stat) gathering engine 540, the stat storage 545 and the dynamic load balancer 555. The stat gathering engine 540, load balancer 555 and the RX/TX threads 531 form in part the queue management system of some embodiments. The statistics that are gathered by the stat gathering engine 540 provide the load balancer with the information that it needs to determine when to assign queues to pools and when to adjust pools.

The stat gathering engine gets stats from different sources in different embodiments. For instance, in some embodiments, this engine pulls stats or receives pushed stats from either the CPU scheduler 525 (for CPU utilizations) and the RX/TX threads (for network traffic). For the network traffic, the network virtualization layer has stats (such as throughput, packet rate, packet drops, etc) gathered from a variety of sources, including each layer of the network stacks (i.e., each module managed by the RX/TX threads).

In some embodiments, the stats gathering engine gathers the following network stats for the load balancer: PNIC packet rate, PNIC throughput, and the CPU utilization for each of RX/TX threads. In some embodiments, the CPU scheduler 525 updates the CPU utilization data, while the RX/TX threads update the PNIC packet rate and throughput, since they are the threads that actually communicate with the PNIC and have the exact counts. In some embodiments, a PNIC driver module is below the queue selector, and this PNIC driver is the module that communicates with the PNIC and updates the PNIC load statistics. Also, in some embodiments, the stats gathering engine not only gathers the PNIC statistics for the load balancer, but also gathers VNIC stats collected by the VNIC emulator.

By relying on VNIC stats, the load balancer can decide to move a latency-sensitive VM to an exclusive queue when its VNIC packet rate is above some threshold that might start hurting whichever VMs sharing the same queue with it. More generally, the load balancer 555 uses the gathered stats to determine which queues to assign to which VMs, when to dynamically assign queues to pools and when to dynamically adjust pools.

In some embodiments, the load balancer periodically (e.g., every few seconds, few milliseconds, few microseconds, etc.) runs a load balancing process. This process pulls stats from the "load stats" data storage 545 that the stat gathering engine maintains, and based on these stats, determines whether it needs to allocate pools, to de-allocate pools, to assign VMs to queues, to resize pools, and/or to preempt queues. In some embodiments, the load balancer assigns VMs to queues by configuring the filters of the PNIC and the virtualization layer to associate a particular queue identifier with a particular source MAC address for outgoing traffic and a particular destination MAC for incoming traffic. To configure the MAC filters of the PNIC, the load balancer uses APIs of the PNIC driver to program filters and hardware features for each queue.

As shown in FIG. 5, the load balancer has three modules, which are the pools 561, the queue balancer 559 and the pool balancer 557. Pools are a software abstract grouping of PNIC queues that the load balancer defines. The load balancer applies different processes to manage queues in different "pools." As such, each pool can be viewed as a set of queues that have the same "feature," where a feature is analogous to hardware features (like RSS/LRO). Examples of such features include VMs requirements (such as low-latency or low-interrupt-rate).

By applying different processes to manage queues in different pools, the load balancer can optimize the allocation of queues and the resizing of the pools differently for different pools. The pool rebalancer 557 resizes each pool based on the pool's resource allocation criteria and preempts queues from other pools when necessary. Example of such resource allocation criteria include max/min number of queues of the pool, total CPU utilization of the pool, network traffic of the pool, quality of service (QoS) constraints of the pool, etc. The queue rebalancer 559 rebalances the queues in the same pool based on the pool's rebalancing criteria. Example of such pool rebalancing criteria include packing VMs on as few queues as possible (e.g., for an HLT pool), distributing the VMs across as many queues as possible (e.g., for an LLR pool), etc. In some embodiments, two different processes that manage two different pools specify different resource allocation criteria, different preemption criteria, different rebalancing criteria, etc.

III. Adjusting VM Allocations and Adjusting Pools

Figure 6:
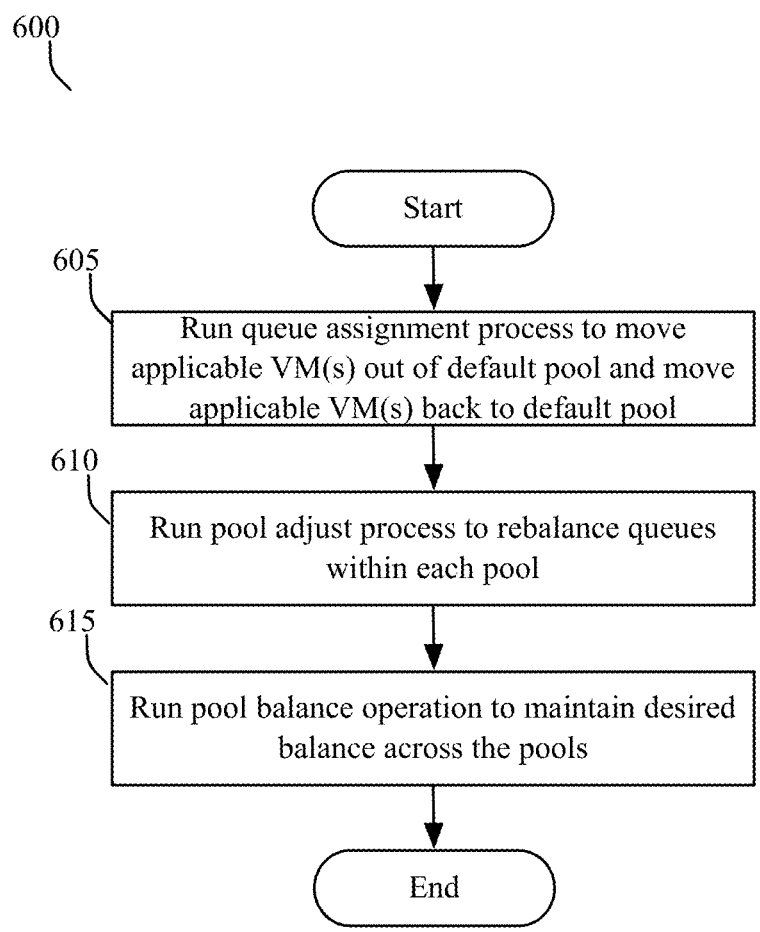
FIG. 6 conceptually illustrates an overall process that a load balancer performs in some embodiments.

FIG. 6 conceptually illustrates an overall process 600 that the load balancer 555 performs in some embodiments. The load balancer 555 in some embodiments performs this process periodically (e.g., every few seconds, few milliseconds, few micro-seconds, etc.) to assign VMs to queues, to rebalance queues within each pool and to maintain desired balance across the pools.

In some embodiments, the process 600 starts when a timer (e.g., an N second timer) expires. As shown in FIG. 6, the process 600 initially invokes (at 605) a queue assignment process that examines the VMs in the default pool to identify any VM that it has to move to a non-default pool, and moves any identified VM to the appropriate non-default queue in the non-default pool. In some embodiments, the queue assignment process moves (at 605) a VM to a non-default queue when the VM's use of a default queue exceeds a threshold level for the default queue or for the VM's use of the default queue. At 605, the process also identifies any VM in a non-default queue that has to move back to the default pool, and moves back to the default pool any identified VM. In some embodiments, the queue assignment process moves (at 605) a VM back to the default pool when the VM's use of its non-default queue is below a threshold level for the non-default queue or the VM's use of the non-default queue. The queue assignment process of some embodiments is further described below by reference to FIG. 7.

After 605, the process 600 invokes (at 610) a pool adjustment process to rebalance queues within each pool. In some embodiments, the pool adjustment process examines each pool to determine whether it has to move one or more VMs between queues in the pool or to new queues in the pool based on one or more optimization criteria for the pool. The pool adjustment process of some embodiments uses different optimization criteria for different pools. For instance, in some embodiments, the optimization criteria for an LLR pool biases the process to distribute the VMs between the queues of the LLR pool, while the optimization criteria for an HLT pool biases the process to aggregate the VMs onto fewer queues in the HLT pool. Based on these criteria and its determinations at 610, the process 600 re-assigns (at 610) VMs between queues in a pool or to a new queue in the pool. The pool adjustment process of some embodiments is further described below.

Next, at 615, the process 600 invokes a pool balancing process that maintains the desired balance across the pools. In some embodiments, the pool balancing process examines the utilization of queues across the various pools. Based on this examination, the balancing process may allocate one or more queues to one pool. It may also de-allocate one or more queues from another pool based on this examination. In one invocation, this process may allocate more queues to more than one pool, or it might de-allocate queues in more than one pool. The rebalancing process across pools is further described below.

One or ordinary skill will realize that the load balancing process 600 is different in other embodiments. For instance, in some embodiments, the process 600 does not have a separate rebalancing operation 615, but rather performs this operation implicitly or explicitly as part of the operations 605 and 610. Also, while certain sub-operations are explained above and below as being part of one of the operations 605, 610, and 615, one of ordinary skill will realize that these sub-operation can be performed in different ones of these operations 605, 610, or 615, or as different operations on their own or as sub-operations of different operations.

After 615, the process 600 ends.

Figure 7:
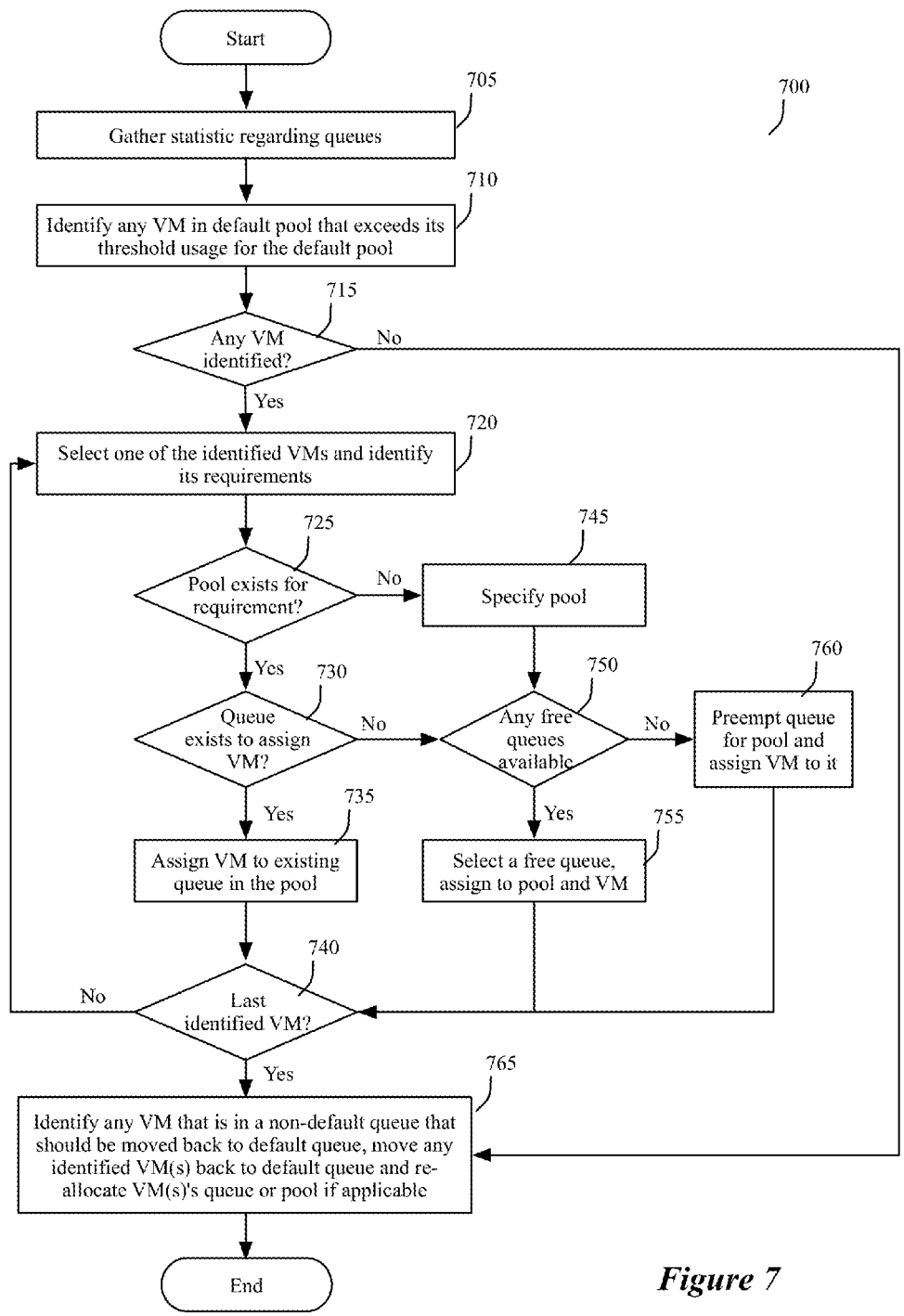
FIG. 7 illustrates a queue assignment process of some embodiments.

FIG. 7 conceptually illustrates a queue assignment process 700 that the load balancer 555 invokes periodically (e.g., every few seconds, every milliseconds, every microseconds, etc.) in some embodiments. The load balancer 555 in some embodiments invokes this process periodically to identify and move any VM that is overutilizing the default queue or underutilizing a non-default queue. As shown in FIG. 7, the process 700 initially gathers (at 705) statistics from the stats storage 545 regarding all VMs' usage of the default queue and the non-default queues. The process uses the retrieved statistics to perform its analysis as further described below.

Next, based on the retrieved statistics, the process identifies (at 710) any VM that uses the default queue in the default pool that is currently exceeding a threshold usage level for the default queue or for the VM's use of the default queue (e.g., when different VMs have different threshold usage levels for the default queue). As mentioned above, some embodiments assign each VM to the default queue when the VM is initialized, but monitor each VM's usage of the default queue and move the VM to a non-default queue when the VM's usage exceeds a threshold value.

At 715, the process determines whether it was able to identify any VM at 710. If not, the process transitions to 765, which will be further described below. Otherwise, the process transitions to 720 to select one of the VMs identified at 710 and to identify the selected VM's requirements for joining a queue of a pool. As mentioned above, some embodiments of the invention define one or more non-default pools of queues that meet one or more differing requirements of different sets of VMs.

Next, at 725, the process determines whether it has previously defined a pool for the selected VM's requirements. For instance, assuming that the selected VM is an LLR VM, the process determines (at 725) whether it has previously defined an LLR pool to assign LLR VMs to this pool's queues. When the process determines (at 725) that it has previously defined the pool for the VM's requirements, it then determines (at 730) whether it can assign the selected VM to one of the queues in this previously defined pool. In other words, at 730, the process determines whether the existing queues of the pool have sufficient available capacity for the VM selected at 720.

When a queue in the pool has sufficient capacity, the process assigns (at 735) the VM to this queue and to this queue's pool, and then transitions to 740, which will be described below. As mentioned above, some embodiments create the association between a VM and a queue through filtering, which uses source MAC address to tie a VM's outgoing traffic to a particular queue and destination MAC address to tie incoming traffic to the particular queue. Some embodiments explicitly specify the association between the VM and the pool, while other embodiments implicitly specify this association through the association between the VM's associated queue and the pool. The association between the VM and the pool that is created at 735 allows the load balancer to apply a common set of processes to manage the VM on its queue with other VMs on this and other queues in the same pool. As mentioned above, these set of processes are different from the set of processes used to manage other VMs in other pools of queue in some embodiments.

When the process determines (at 725) that a pool does not exist for the selected VM's requirement (e.g., an LLR requirement), the process specifies (at 745) a pool for the selected VM's requirement (e.g., specifies an LLR pool), and then transitions to 750. The process also transitions to 750 when it determines (at 730) that the previously specified pool for the VM's requirement does not have any queue that has sufficient capacity for the selected VM.

At 750, the process determines whether there is any PNIC queue that is currently unassigned to any VM (i.e., whether there is any queue in the free pool of queues). If so, the process (at 755) selects one of the free queues, assigns it to the pool, assigns the selected VM to this queue and the pool, and then transitions to 740, which will be described below. Otherwise, the process preempts (at 760) one of the queues used by another one of the non-free pools. Preemption involves first reassigning the VMs that are using the preempted queue to other queues in the pool that includes the preempted queue. In some embodiments, the process will not be able to preempt a queue from another pool in some cases because the current non-default pool of the VM has a lower priority than the other non-default pools. Once all the VMs have been reassigned and the queue has processed all of the traffic for such VMs, the process assigns (760) the preempted queue to the pool for the selected VM's requirement. The process also assigns (at 760) the selected VM to this queue and the pool, and then transitions to 740.

At 740, the process determines whether it has processed all of the VMs identified at 710. If not, the process returns to 720 to select another identified VM. Otherwise, after the process has assigned each VM identified at 710 to a pool and queue, the process determines (at 765) whether any VM that is in a non-default queue should be moved back to the default pool, based on the statistics retrieved at 705. In some embodiments, the process moves a VM back to a default queue when the VM's usage of a non-default queue falls below a threshold usage level for the non-default queue or for the VM's use of the non-default queue. The process in some of these embodiments only moves the VM when its usage has been below the threshold usage level for a sufficiently long period of time. When the process identifies any VM at 765, it moves the identified VM back to a default queue of the default pool, and removes this VM from the pool of its previously assigned non-default queue. When no other VM uses the previously assigned non-default queue after this re-assignment, the process 700 also re-allocates (at 765) the non-default queue to the pool of free queues. When this re-allocated queue is the last queue of a pool, the process 700 of some embodiments also de-allocates the pool as it no longer contains any queues. Other embodiments, however, do not de-allocate the pool in such circumstances. After 765, the process ends.

Figure 8:
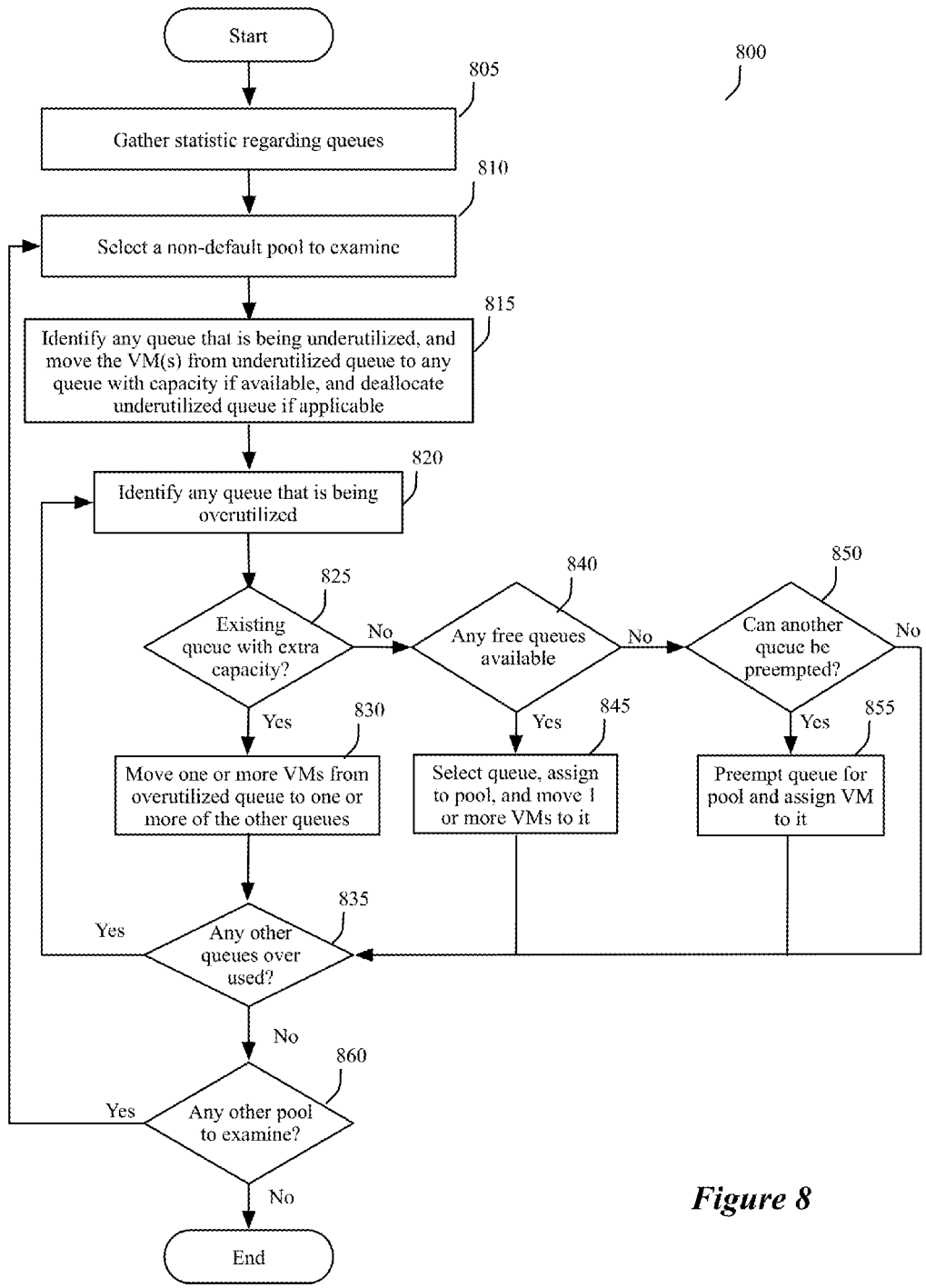
FIG. 8 conceptually illustrates a pool adjustment process that a load balancer invokes periodically (e.g., every few seconds) in some embodiments.

FIG. 8 conceptually illustrates a pool adjustment process 800 that the load balancer 555 invokes periodically (e.g., every few seconds, every milliseconds, every microseconds, etc.) in some embodiments. The load balancer 555 in some embodiments invokes this process periodically to rebalance queues within each pool. In some embodiments, the pool adjustment process examines each pool to determine whether it has to move one or more VMs between queues in the pool or to new queues in the pool based on one or more optimization criteria for the pool. The pool adjustment process of some embodiments uses different optimization criteria for different pools. For instance, in some embodiments, the optimization criteria for an LLR pool biases the process to distribute the VMs between the queues of the LLR pool, while the optimization criteria for an HLT pool biases the process to aggregate the VMs onto the queues in the HLT pool.

As shown in FIG. 8, the process 800 initially gathers (at 805) statistics from the stats storage 545 regarding all VMs' usage of the default queue and the non-default queues. The process uses the retrieved statistics to perform its analysis as further described below. After 805, the process 800 selects (at 810) one of the non-default pools to examine (e.g., selects the LLR pool to examine). Next, at 815, the process determines whether any queue in the pool is underutilized. If it finds any such queue, the process then determines (at 815) whether any other queue in the selected pool has the capacity for the VM or VMs that are currently using any underutilized queue that it identified at 815. When the process identifies such queues with excess capacity, the process assigns (at 815) the VM or VMs from an underutilized queue to the queue or queues with excess capacity. The process also de-allocates (at 815) the underutilized queue from the selected pool (i.e., assigns the underutilized queue to the free pools) when the underutilized queue does not have any other VM assigned to it after the move. In this manner, an underutilized queue can be freed up for allocation to another pool or to the same pool at a later time.

After 815, the process identifies (at 820) any queue that is being overutilized in the selected pool. The process then determines (at 825) whether the selected pool has any queue with excess capacity to handle the traffic of one or more of the VMs that are currently assigned to the identified overutilized queue. When the process identifies (at 825) one or more queues with excess capacity, the process assigns (at 830) one or more of the VMs that are currently assigned to the identified overutilized queue to one or more queues with excess capacity, and then transitions to 835, which will be described below.

On the other hand, when the process determines (at 825) that the selected pool does not have any excess capacity queues to handle some of the traffic that is currently going through the overutilized queue, the process determines (at 840) whether there are any free queues (e.g., whether the free pool has any queues). If so, the process allocates (at 845) one or more of the free queues to the selected pool (i.e., the pool selected at 810). At 845, the process also assigns one or more of the VMs that are currently assigned to the identified overutilized queue to the newly allocate queue(s), and then transitions to 835, which will be described below When the process determines (at 840) that there are no free queues, the process determines (at 850) whether it can preempt a queue from another pool. In some embodiment, not all pools can preempt queues from other pools; only some pools (e.g., LLR pool) can preempt queues from other pools (e.g., HLT pool). Also, in some embodiments, some pools can preempt queues from other pools only under certain circumstances (e.g., when the other pool is not heavily overloaded itself).

When the process determines (at 850) that it cannot preempt a queue from another pool, it transitions to 835. On the other hand, when the process determines (at 850) that it can preempt a queue from another pool, the process assigns (at 855) all the VMs that are currently using the preempted queue to new queues within the same pool as the preempted pool. After re-assigning all of the VMs, the process then allocates (at 855) the preempted queue to the selected pool (i.e., the pool selected at 810) and assigns one or more of the VMs that are currently assigned to the identified overutilized queue to the newly allocate queue(s), and then transitions to 835.

At 835, the process determines whether it has examined all the non-default pools that it should examine. If so, it ends. Otherwise, the process returns to 810 to select another non-default pool. The process uses different criteria to assess underutilization and overutilization of queues for different pools. For instance, for an LLR pool, the overutilization threshold might be a 50% load and the underutilization threshold might be a 5%, while for an HLT pool, the overutilization threshold might be 90% and the underutilization threshold might be 75%.

Also, as mentioned above, some embodiments resize different pools based on different pool resource allocation criteria, such as max/min number of queues of the pool, total CPU utilization of the pool, network traffic of the pool, quality of service (QoS) constraints of the pool, etc. Similarly, some embodiments rebalance the queues in the different pools based on different rebalancing criteria, such as packing VMs on as few queues as possible (e.g., for an HLT pool), distributing VMs across as many queues as possible (e.g., for an LLR pool), etc.

Figure 9:
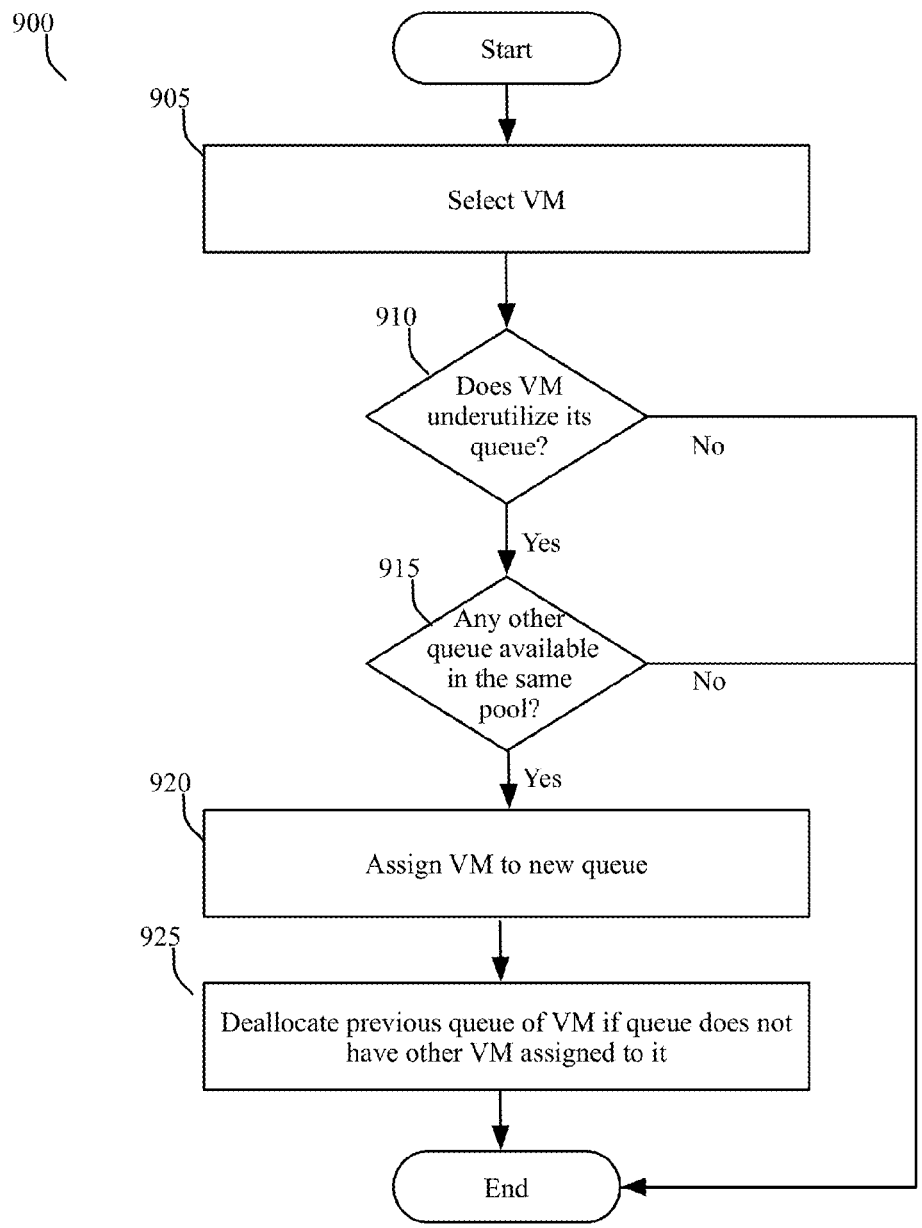
FIG. 9 illustrates a process that is performed by the load balancer of some embodiments to assess a VM's utilization of its queue.

In some embodiments, the process 800 of FIG. 8 examines underutilized queues in order to re-assign their VMs to other queues in the same pool so that it can de-allocate the underutilized queues. In addition, or instead of, examining the underutilized queues, the load balancer of some embodiments examines each VM that is assigned to a non-default queue to determine whether the VM's use of its non-default queue is below a threshold level. FIG. 9 illustrates a process 900 that is performed by the load balancer of some embodiments to assess a VM's utilization of its queue.

As shown in this figure, the process 900 starts by selecting (at 905) a VM of a non-default queue. Next, at 910, the process determines whether the VM is underutilizing its queue. For instance, in some embodiments, a VM is deemed to underutilize its queue when only 1% of the traffic through the queue is attributed to the VM.

When the process determines (at 910) that the VM is not underutilizing its queue, the process ends. Otherwise, the process determines (at 915) whether another queue in the same pool as the current queue of the VM has capacity for the selected VM. If not, the process ends. Otherwise, the process (at 920) assigns the VM to a new queue in the same pool as the current queue of the VM. The process then de-allocates (at 925) the previous queue of the VM if the previous queue does not have any other VM assigned to it.

Figure 10:
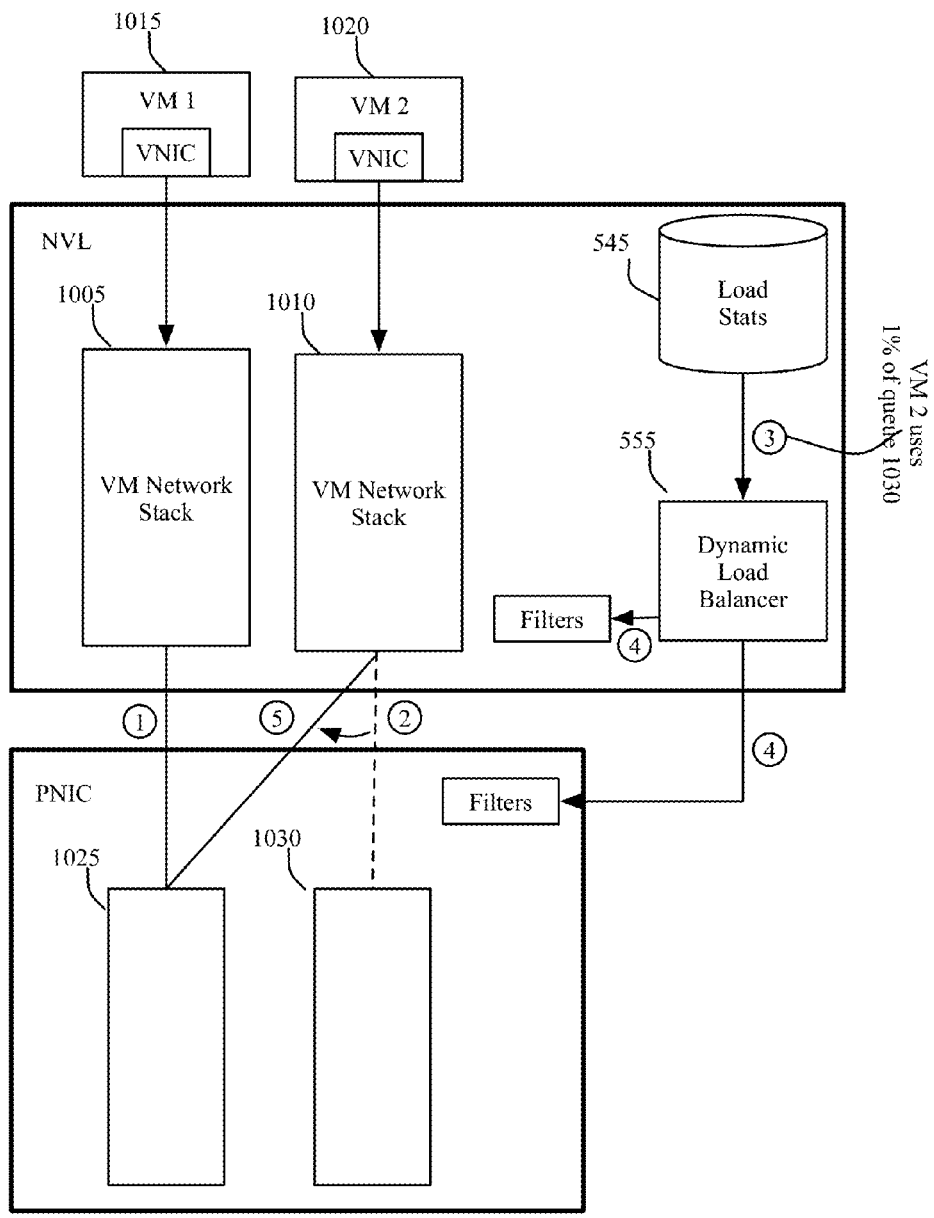
FIG. 10 illustrates an example of re-assigning a VM from a first queue to a second queue because of the underutilization of the first queue or because of the VM's underutilization of the first queue.

FIG. 10 illustrates an example of re-assigning a VM from a first queue to a second queue because of the underutilization of the first queue or because of the VM's underutilization of the first queue. Specifically, this figure illustrates the network stacks 1005 and 1010 of two VMs 1015 and 1020 that are initially assigned to two queues 1025 and 1030. These two VMs are assigned to these two queues upon the initialization of the VMs.

At some later point in time, the load balancer 555 retrieves statistics regarding the various VMs use of various queues. Based on these statistics, the load balancer detects that the VM 1020 uses less than 1% of the capacity of the queue 1030. As this VM is underutilizing its queue, the load balancer then defines filters in network virtualization layer and in the PNIC that re-assign the VM 1020 and its network stack 1010 from the queue 1030 to the queue 1025. If no other VM is using the queue 1030, the load balancer will also re-allocate the queue 1030 to the free pool of queues. In some embodiments, the load balancer would re-assign VM 1020 to the queue 1025 only if it determines that upon this re-assignment (and the re-assignment of any other VMs that are concurrently using the queue 1030), the queue 1030 could be freed from any VM traffic and hence re-allocated to the free pool. In other embodiments, however, the load balancer makes its re-allocation decision solely on the VM's own usage of its queue.

Figure 11:
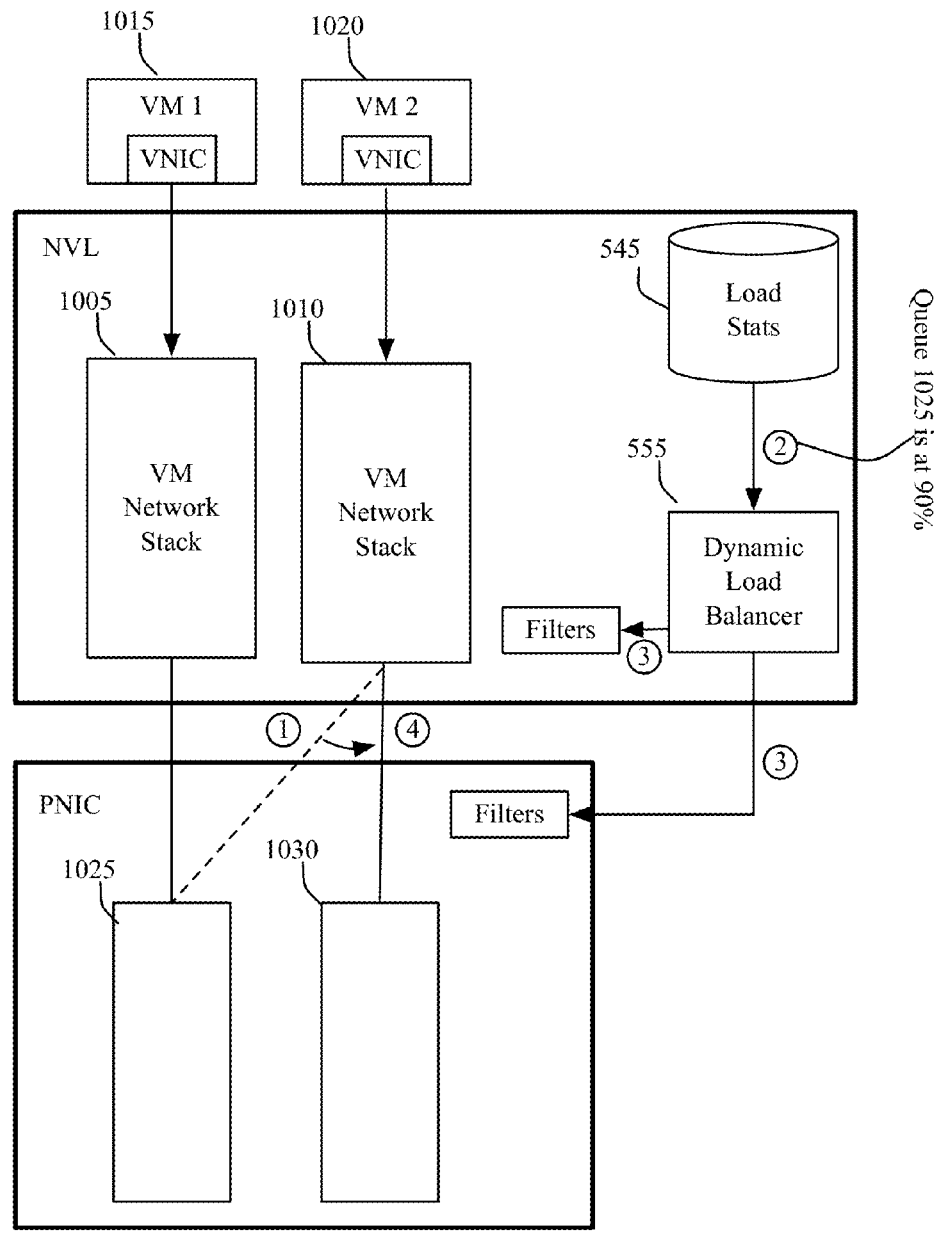
FIG. 11 illustrates an example of re-assigning a VM from a first queue to a second queue because of the overutilization of the first queue.

FIG. 11 illustrates an example of re-assigning a VM from a first queue to a second queue because of the overutilization of the first queue. Specifically, this figure illustrates the same two network stacks 1005 and 1010 of the same two VMs 1015 and 1020 after both VMs have been assigned to the queue 1025. At some point in time, the load balancer 555 retrieves statistics regarding the various VMs use of various queues. Based on these statistics, the load balancer detects that the queue 1025 is handling traffic at 90% of its capacity. As this queue is being overutilized, the load balancer then defines filters in network virtualization layer and in the PNIC that re-assign the VM 1020 and its network stack 1010 from the queue 1025 to the queue 1030.

As mentioned above, the load balancer in some embodiments is a pool balancing process that maintains the desired balance across the pools. In some embodiments, the pool balancing process examines the utilization of queues across the various pools. Based on this examination, the balancing process may allocate one or more queues to one pool. It may also de-allocate one or more queues from another pool based on this examination. In one invocation, this process may allocate more queues to more than one pool, or it might de-allocate queues in more than one pool.

Figure 12:
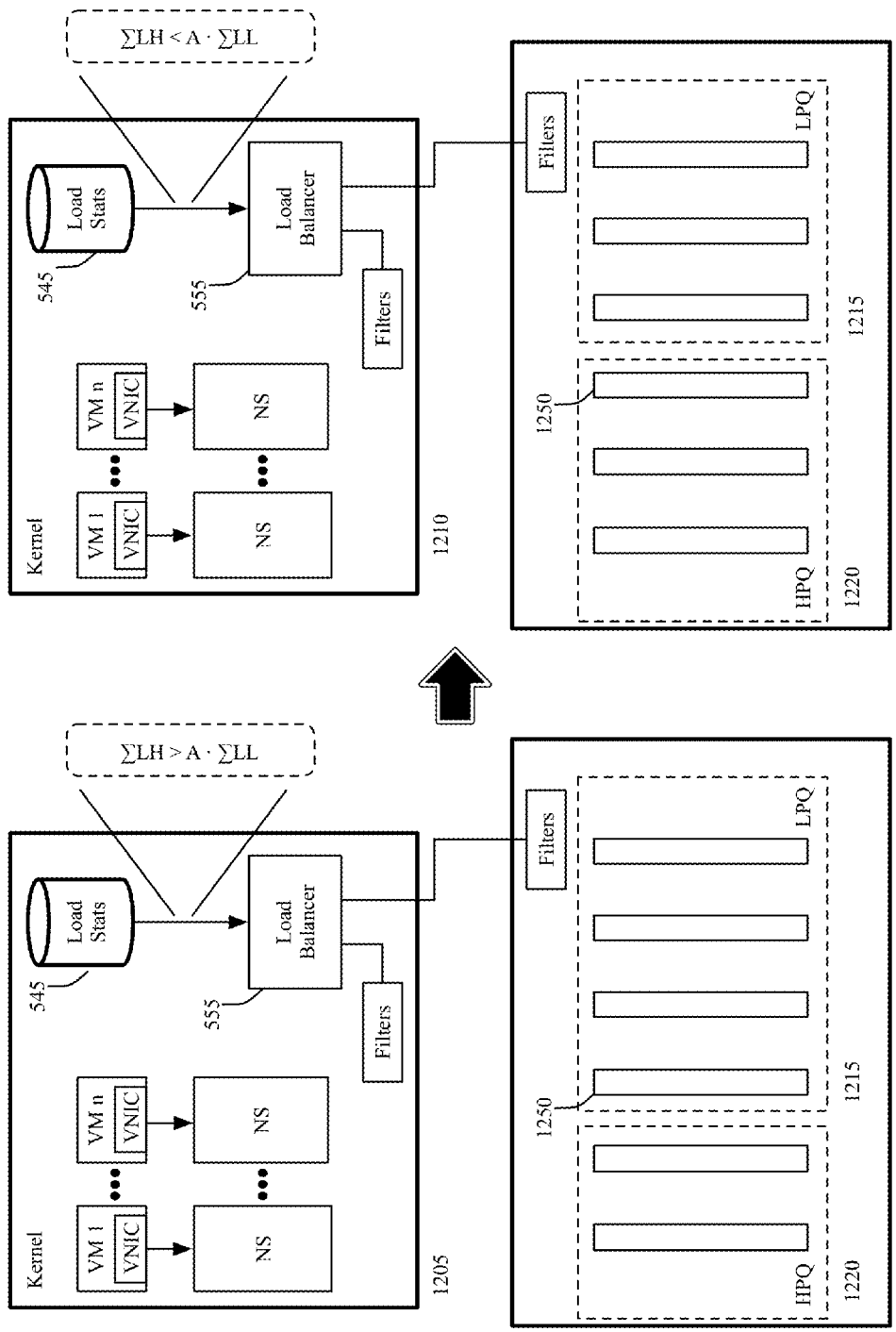
FIG. 12 illustrates an example of the pool balancing across the pools.

FIG. 12 illustrates an example of the pool balancing across the pools. Specifically, it shows the addition of a queue from a low priority pool to a high priority pool 1215 and 1220 in two stages 1205 and 1210. In the first stage, the load balancer 555 retrieves statistics from the statistics storage 545. Based on the retrieved statistics, the load balancer determines that the load (LH) through the queues of the high priority pool 1220 is more than a certain percentage (e.g., 75%) of the load (LL) through the queues of the low priority pool 1215.

As some embodiments want the load through the high priority queues to be substantially less than the load through the low priority queues, the load balancer sets the filters so that a queue 1250 from the low priority pool is removed from this pool and added to the high priority pool. Before the queue 1250 can switch to the high priority pool, the VMs that were using the queue 1250 in the low priority pool have to be assigned to different queues in this pool. FIG. 12 illustrates that after the addition of the queue 1250 to the high priority queue, the load (LH) through the high priority queues is less than the specified percentage of the load (LL) through the low priority queues.

IV. Non-VM Addressable Nodes and Other Filtering

Several embodiments have been described above that, for data traffic to or from one or more VMs executing on a host device, dynamically define pools of queues, uniquely manage each pool, dynamically modify queues within a pool, and dynamically re-assign a VM's traffic to a new queue. Many of these embodiments use the destination or source MAC addresses of the packets received or transmitted by the host device to assign the VM data traffic packets to the different pools and the different queues within the pools.

However, not all embodiments use MAC addresses to assign data traffic to pools and queues within pools. Also, the queue management methods and apparatuses of some embodiments are used for data traffic other than VM data traffic. Specifically, in addition to the VM data traffic or instead of VM data traffic, some embodiments dynamically define pools, uniquely manage each pool, dynamically modify the queues within the pools, and dynamically re-assign data traffic to and from non-VM addressable nodes (e.g., source end nodes or destination end nodes) that execute on a host. The methods and apparatuses of some embodiments are used to perform these operations to differentiate the routing of different types of data traffic through the queues.

Several such embodiments are further described below. Specifically, sub-section A describes several embodiments that use MAC address filtering to route non-VM traffic data to different queues of different pools. Sub-section B then describes several embodiments that use five-tuple IP filtering to route different types of data traffic to different queues of different pools.

A. MAC Filtering for Non-VM Traffic

Some embodiments use MAC address filtering to route data traffic of non-VM data addressable nodes executing on a host device to different pools of queues, and different queues within the pools. For instance, the method of some embodiments monitors data traffic for a set of non-VM addressable nodes (e.g., data end nodes) through the physical NIC of a host device. Based on this monitoring, the method specifies a pool for at least a set of the non-VM addressable nodes, and assigns a set of the queues to the pool. The method then uses destination or source MAC filtering to direct to the assigned set of queues the data traffic that is received by, or transmitted from, the host device for the set of non-VM addressable nodes.

Alternatively, or conjunctively, based on the monitoring, the method can modify the set of queues assigned to a pool for the set of the non-VM addressable nodes. Examples of such modifications include adding or removing a queue from the pool when one or more of the queues of the pool are overutilized or underutilized. In some embodiments, the method adds a queue to the pool by preempting a queue from another pool, e.g., by using one of the above-described preemption methodologies.

Also, alternatively or conjunctively to the above-described operations, the method can re-assign the data traffic for a non-VM addressable node (e.g., data end node) from a first queue in the pool to a second queue in the pool, based on the monitoring. For instance, based on the monitoring, the method of some embodiments detects that the traffic for the non-VM addressable node through the first queue falls below a minimum threshold amount of traffic (e.g., for a duration of time). Because of this underutilization, the method switches this traffic to the second queue. Before making this switch, the method of some embodiments determines that the traffic through the second queue does not exceed a maximum threshold amount of traffic.

Based on the monitoring, the method of some embodiments detects that the traffic through the first queue exceeds a maximum threshold amount of traffic (e.g., for a duration of time). Because of this overutilization, the method switches the traffic for a non-VM addressable node (e.g., data end node) from the first queue to the second queue. Again, before making this switch, the method of some embodiments determines that the traffic through the second queue does not exceed a maximum threshold amount of traffic.

Figure 13:
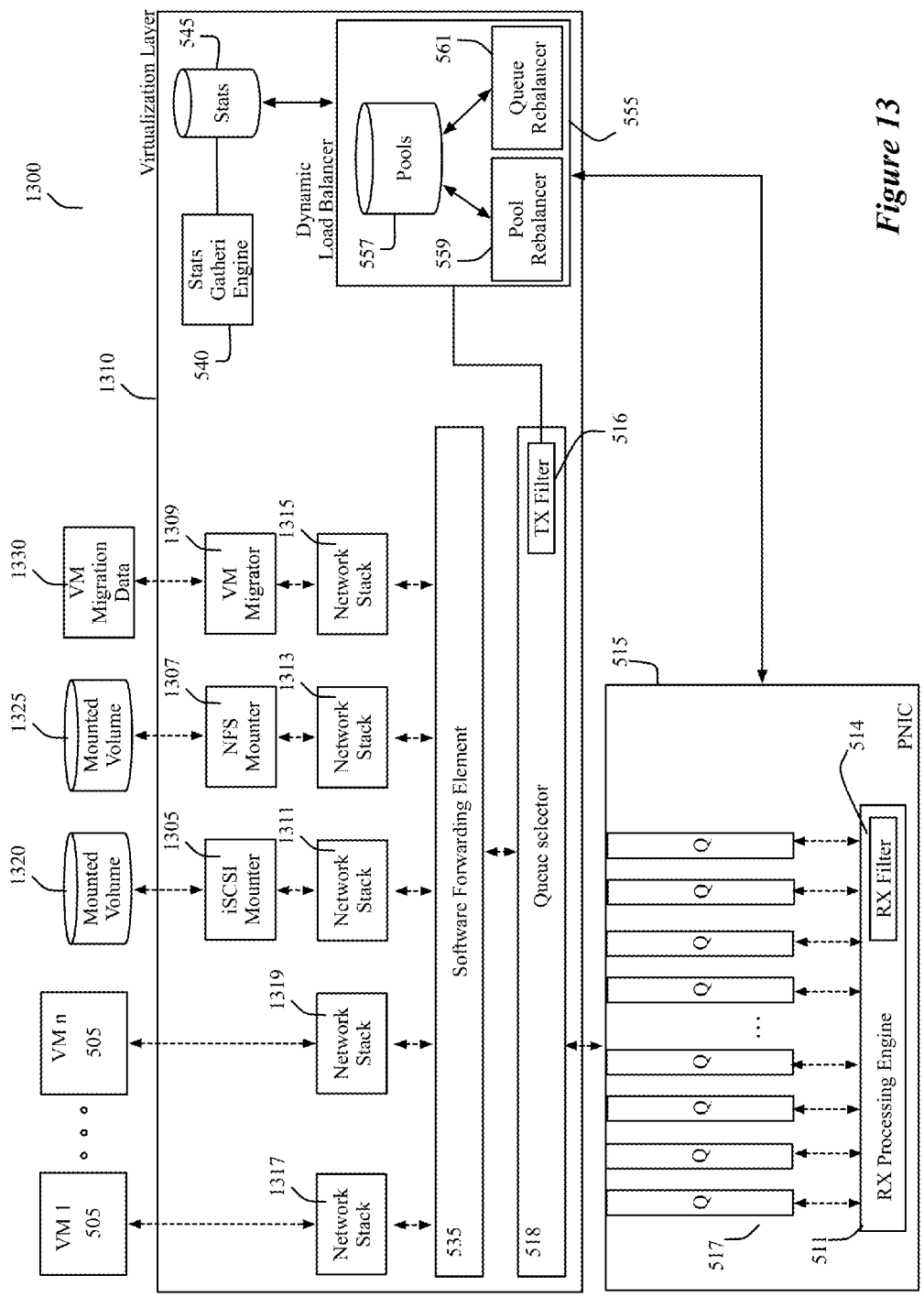
FIG. 13 illustrates a queue management system of some embodiments that uses MAC address filtering to route data traffic of VMs and non-VM data addressable nodes executing on a host device to different pools of queues, and different queues within the pools.

FIG. 13 illustrates a queue management system 1300 of some embodiments that uses MAC address filtering to route data traffic of VMs and non-VM data addressable nodes executing on a host device to different pools of queues, and different queues within the pools. This system is similar to the system 500 of FIG. 5, except that the system 500 only manages traffic to and from VM end nodes, while the system 1300 manages traffic to and from VM and non-VM addressable nodes, such as an iSCSI (internal small computer system interface) mounter 1305, an NFS (network file storage) mounter 1307, and a VM migrator 1309. The system 1300 breaks up the queues into different priority pools with the higher priority pools reserved for particular types of addressable nodes. It also dynamically adjusts the queues in each pool (i.e., dynamically adjusts the size of the pools), and dynamically reassigns an addressable node to a new queue in its pool based on one or more optimization criteria (e.g., criteria relating to the underutilization or overutilization of the queue).

FIG. 13 illustrates (1) several VMs 505 executing on a host (not shown), (2) two mounted storage volumes 1320 and 1325, (3) VM migration data 1330, (4) the host's physical NIC 515 that is shared by the VM and non-VM nodes, and (5) a virtualization layer 1307 that facilitates traffic to and from the VMs through the shared PNIC. As further shown, the virtualization layer includes several non-VM addressable nodes, such as the iSCSI mounter 1305, the NFS mounter 1307, and the VM migrator 1309. This layer also includes a network stack 1311, 1313, 1315, 1317 or 1319 for each VM or non-VM addressable node. The virtualization layer also includes a software forwarding element 535 (e.g., software switch), a queue selector 518, a dynamic load balancer 555, statistic gathering engine 540, and statistic storage 545.

In some embodiments, the PNIC 515 of FIG. 13 is identical to the above-described PNIC 515 of FIG. 5. As mentioned above, the PNIC has a receive side (RX) processing engine 511 for receiving incoming packets from a wired or wireless link. The RX processing engine has a MAC filter 514, which is configured to associate each (VM or non-VM) addressable node's incoming traffic to one queue pair based on the destination MAC. The virtualization layer maintains an analogous filter 516 for outgoing packets, and a queue selector 518 in this layer uses the data in this filter to configure each addressable node's outgoing traffic to use the same queue pair as the incoming traffic. In some embodiments, the filter 516 specifies an addressable node in terms of the VM's or its VNIC's source MAC address, while in other embodiments it specifies a VM in terms of the port ID of a software forwarding element to which the VM's VNIC connects. As PNIC 515 of FIG. 13 is identical to the PNIC 515 of FIG. 5, it will not be described further in order not to obscure the description of FIG. 13 with unnecessary detail The VM and non-VM addressable nodes executes on top of a hypervisor (not shown), which, in some embodiments, includes the virtualization layer 1310. The VM and non-VM addressable nodes can be source and destination end nodes for packets that are transmitted through the network. As mentioned above, these nodes include the VMs 505, the volume mounters 1305 and 1307, and the VM migrator 1309. The iSCSI mounter 1305 mounts a storage volume 1320 on the host. This storage volume 1320 is some or all of an external storage (i.e., a storage external to the host, such as a storage server) that is accessible through the iSCSI protocol. Similarly, the NFS mounter 1307 mounts a storage volume 1325 on the host. This storage volume 1325 is some or all of an external storage (e.g., a storage server) that is accessible through the NFS protocol. The mounted volumes can then be accessed by the modules (e.g., VMs) executing on the host or other devices, as if the external storages reside on the host. The VM migrator 1309 gathers data about each VM executing on the host to facilitate the live migration of a VM from one host to another. One example of such a VM migrator is the vMotion module used in the ESX hypervisor of VMware Inc.

Each addressable node connects to the software forwarding element 535 through a network stack and a port (not shown) of the forwarding element. In some embodiments, each VM's network stack includes a VNIC emulator 527 and an I/O chain 529, and is managed by receive/transmit threads 531, as described above by reference to FIG. 5. In some embodiments, the network stack of each non-VM addressable node includes a hypervisor kernel network interface and receive/transmit threads. In some embodiments, the hypervisor kernel network interface (e.g., vmknic of VMware Inc.) of each non-VM addressable node includes a TCP/IP stack for processing TCP/IP packets received for the non-VM addressable node and sent by the non-VM addressable node. For instance, in some embodiments, each non-VM addressable node's network (1) affixes TCP/IP packet headers to packets that it sends from its corresponding mounted volume 1320/1325 or migration data store 1330, and (2) removes TCP/IP packet headers from packets that it receives for storing in its corresponding mounted volume or migration data store.

In some embodiments, the hypervisor kernel network interface of a non-VM addressable node (e.g., the VM migrator 1309) does not include a TCP/IP stack, but rather includes other packet processing modules, such an RDMA (remote direct memory access) packet processing module.

Also, in some embodiments, the network stack of a non-VM addressable node includes other I/O chain modules for performing other transform operations on the packets sent by and received for their corresponding volumes or data stores. Like the receive/transmit threads 531 of FIG. 5, the receive/transmit threads of the network stack of each non-VM addressable node manages the modules in the network stack, interacts with the PNIC queue 517 that is associated with the stack's non-VM addressable node, and gathers statistics regarding the operations of the modules of its stack.

As mentioned above, the virtualization layer also includes the statistics (stat) gathering engine 540, the stat storage 545 and the dynamic load balancer 555. The stat gathering engine 540, load balancer 555 and the RX/TX threads (not shown) form in part the queue management system of some embodiments. The statistics that are gathered by the stat gathering engine 540 provide the load balancer with the information that it needs to determine when to assign queues to pools and when to adjust pools.

The stat gathering engine gets stats from different sources in different embodiments. For instance, in some embodiments, this engine pulls stats or receives pushed stats from either the CPU scheduler 525 (for CPU utilizations) and the RX/TX threads (for network traffic). For the network traffic, the virtualization layer has stats (such as throughput, packet rate, packet drops, etc) gathered from a variety of sources, including each layer of the network stacks (i.e., each module managed by the RX/TX threads).

In some embodiments, the stats gathering engine gathers the following network stats for the load balancer: PNIC packet rate, PNIC throughput, and the CPU utilization for each of RX/TX threads. In some embodiments, the CPU scheduler updates the CPU utilization data, while the RX/TX threads update the PNIC packet rate and throughput, since they are the threads that actually communicate with the PNIC and have the exact counts. In some embodiments, a PNIC driver module is below the queue selector, and this PNIC driver is the module that communicates with the PNIC and updates the PNIC load statistics. Also, in some embodiments, the stats gathering engine not only gathers the PNIC statistics for the load balancer, but also gathers VNIC stats or stats that are gathered by the non-VM addressable node.

By relying on the gathered stats, load balancer can decide to move a latency-sensitive (VM or non-VM) addressable node to an exclusive queue or higher priority pool when its packet rate is above some threshold, or it is being hurt by the throughput of one or more other nodes that share the same queue with it. More generally, the load balancer 555 uses the gathered stats to determine which queues to assign to which addressable node, when to dynamically assign queues to pools and when to dynamically adjust pools.

In some embodiments, the load balancer periodically (e.g., every few seconds, few milliseconds, few microseconds, etc.) runs a load balancing process. This process pulls stats from the "load stats" data storage 545 that the stat gathering engine maintains, and based on these stats, determines whether it needs to assign addressable nodes to queues, to resize pools, and/or to preempt queues. The load balancer assigns nodes to queues by configuring the filters of the PNIC and the virtualization layer to associate a particular queue identifier with a particular source MAC address for outgoing traffic and a particular destination MAC for incoming traffic. To configure the MAC filters of the PNIC, the load balancer uses APIs of the PNIC driver to program filters and hardware features for each queue.

As shown in FIG. 13, the load balancer has three modules, which are the pools 561, the queue balancer 559 and the pool balancer 557. Pools are a software abstract grouping of PNIC queues that the load balancer defines. The load balancer applies different processes to manage queues in different "pools." As such, each pool can be viewed as a set of queues that have the same "feature," where a feature is analogous to hardware features (like RSS/LRO). Examples of such features include VMs requirements (such as low-latency or low-interrupt-rate).

By applying different processes to manage queues in different pools, the load balancer can optimize the allocation of queues and the resizing of the pools differently for different pools. The pool rebalancer 557 resizes each pool based on the pool's resource allocation criteria and preempts queues from other pools when necessary. Example of such resource allocation criteria include max/min number of queues of the pool, total CPU utilization of the pool, network traffic of the pool, quality of service (QoS) constraints of the pool, etc. The queue rebalancer 559 rebalances the queues in the same pool based on the pool's rebalancing criteria. Example of such pool rebalancing criteria include packing addressable nodes on as few queues as possible (e.g., for an HLT pool), distributing addressable nodes across as many queues as possible (e.g., for an LLR pool), etc. In some embodiments, the load balancer 555 manages the PNIC queues to process VM and non-VM addressable nodes by using the processes like those described above by reference to FIGS. 6-9 above. In some of these embodiments, these processes are just modified to monitor and manage not only VM traffic but also traffic to and from non-VM addressable nodes (e.g., traffic to and from mounters 1305 and 1307 and the migrator 1309).

B. Alternative Filtering to Differentiate Different Types of Packets

Instead of MAC address filtering, some embodiments use other filtering techniques to treat differently different types of packets, e.g., to define different pools for different sets of packet types, to manage differently each pool, to modify dynamically the queues within the pools, and to re-assign dynamically different types of data traffic. For instance, based on non-MAC packet identifiers, the method of some embodiments identifies and monitors a first type of data traffic through the NIC of a host device. Based on the monitoring, the method specifies a pool for the first type of data traffic, and assigns a set of the queues to the pool. The method then uses non-MAC address filtering to direct the first type of data traffic to the assigned set of queues.

Alternatively, or conjunctively, based on the monitoring, the method can modify the set of queues assigned to a pool for the first type of data traffic that is identified through the non-MAC packet identifiers. Examples of such modifications include adding or removing a queue from the pool when one or more of the queues of the pool are overutilized or underutilized. In some embodiments, the method adds a queue to the pool by preempting a queue from another pool, e.g., by using one of the above-described preemption methodologies.

Also, alternatively or conjunctively to the above-described operations, the method can re-assign the first type of data traffic from a first queue in the pool to a second queue in the pool, based on the monitoring. For instance, based on the monitoring, the method of some embodiments detects that the first type of data traffic through the first queue falls below a minimum threshold amount of traffic (e.g., for a duration of time). Because of this underutilization, the method switches this traffic to the second queue. Before making this switch, the method of some embodiments determines that the traffic through the second queue does not exceed a maximum threshold amount of traffic.

Alternatively, based on the monitoring, the method of some embodiments might detect that the first type of data traffic through the first queue exceeds a maximum threshold amount of traffic (e.g., for a duration of time). Because of this overutilization, the method switches the first type of data traffic from the first queue to the second queue. Again, before making this switch, the method of some embodiments determines that the traffic through the second queue does not exceed a maximum threshold amount of traffic.

Different embodiments use different non-MAC filtering. Some embodiments use the packet header data to classify the packet payload to be one of several types. For instance, some embodiments use the five-tuple IP data in the L3 and L4 packet header to classify the packet payload. The five-tuple data include source port identifier, destination port identifier, source IP address, destination IP address, and the protocol. Using these five identifiers, the filters of some embodiments can designate the IP packets to be any number of different types, such as VOIP packet, video packet, audio packet, FTP packet, HTTP packet, HTTPS packet, Remote Desktop packet (PCoIP, VNC, RDP), management packet (authentication, server health monitoring, time synchronization), E-mail packet (POP3, SMTP), etc. Since all of these protocols have different traffic pattern, some embodiments separate one or more of them into different pools of queues, and use different optimization criteria to allocate the data traffic to the queues in each pool.

The list provided below illustrates how the five tuples can be used to differentiate web traffic, VoIP, video streaming, remote desktop, management, e-mails, by using the following notation: Protocol-src_ip-dst_ip-src_port-dest_port, with * denoting wildcard match. In this list, it is assumed that that a VM is the client that requests the service/data/service from the server.

Web: TCP-*-*-*-80/443 (80 for HTTP and 443 for HTTPS)
VoIP (Skype): TCP/UDP-*-*-23399-*or TCP/UDP-*-*-*-23399 (incoming and outgoing traffic)
Video Streaming (MMS): TCP/UDP-*-*-*-1755
Remote Desktop (PCoIP): TCP/UDP-*-*-*-4172
Authentication (Kerberos): TCP/UDP-*-*-*-88
E-Mail (POP3): TCP-*-*-*-110

Figure 14:
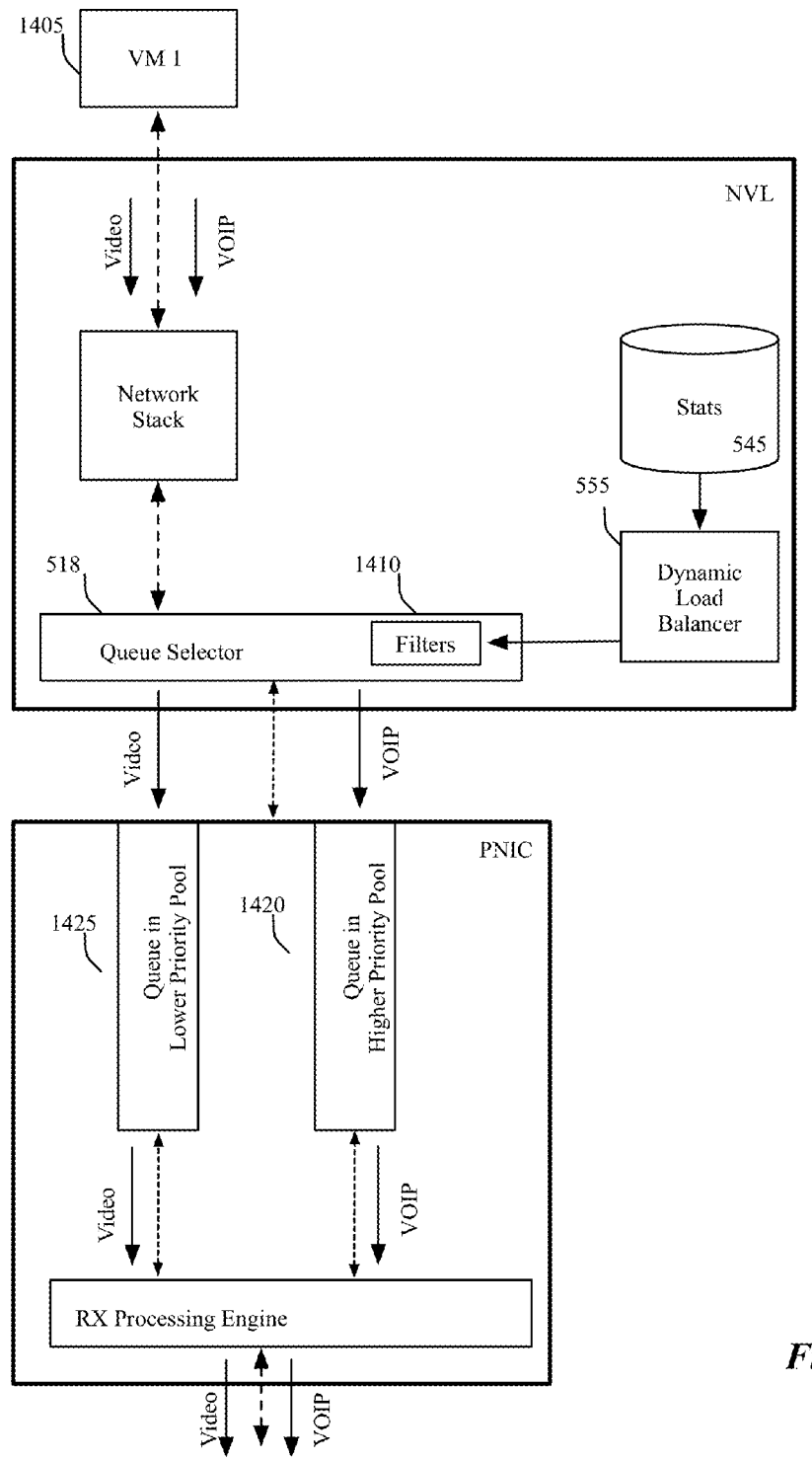
FIGS. 14 and 15 illustrate examples that show some embodiments use five-tuple filters to differentiate VOIP and video packets that are transmitted or received by a virtual machine during a video presentation.
Figure 15:
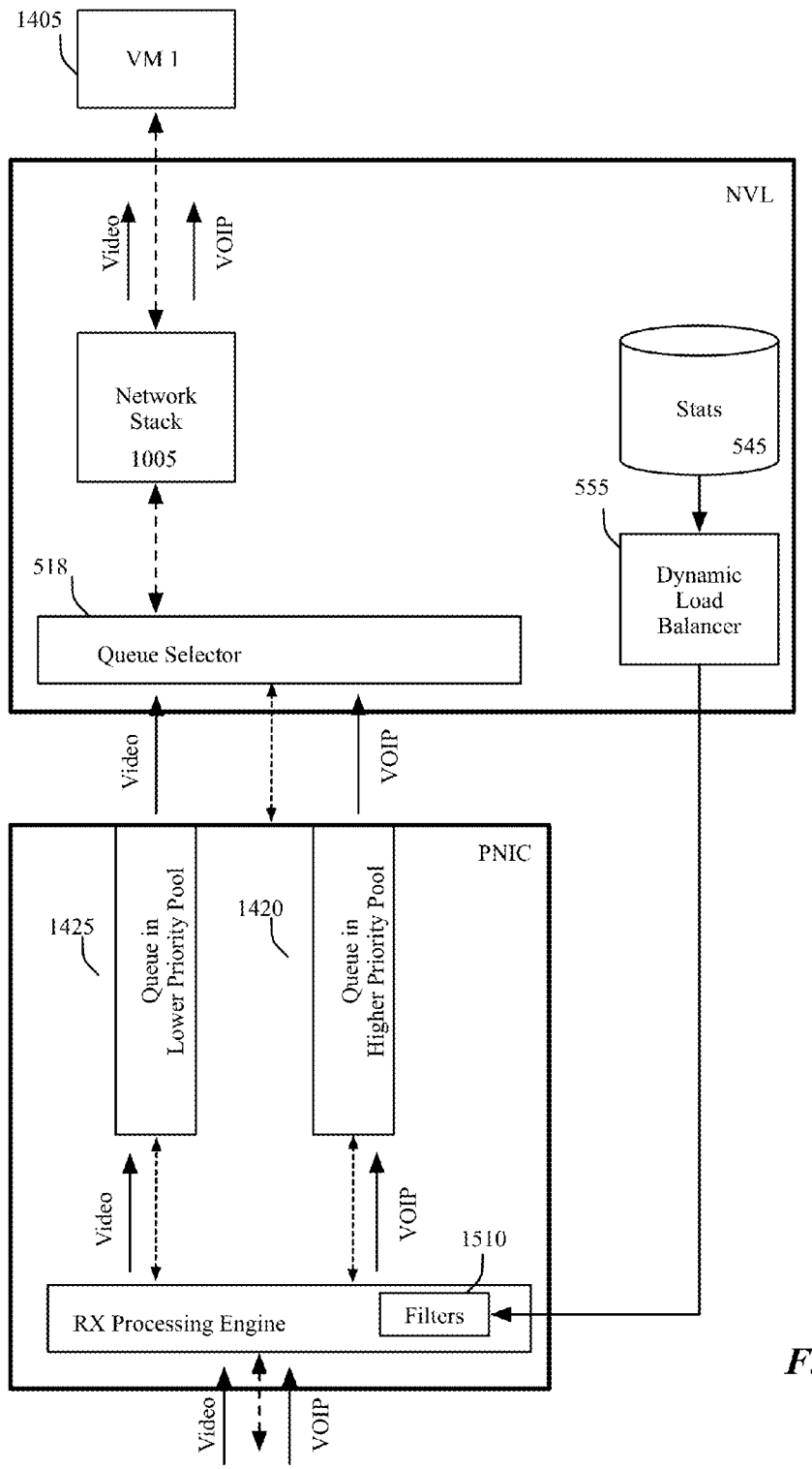

FIGS. 14 and 15 illustrate examples that show some embodiments use five-tuple filters to differentiate VOIP and video packets that are transmitted or received by a virtual machine during a video presentation. FIG. 14 illustrates the case where the five-tuples are used to differentiate VOIP and video packets that are being transmitted by a VM 1405. In this example, the dynamic load balancer 555 sets one set of five-tuple filters 1410 in the queue selector 518 to route VOIP packets from the VM 1405 to the high priority queue pool 1420, while setting another set of five-tuple filters to route video packets from this VM to the low priority queue pool 1425.

FIG. 15 illustrates the case where the five-tuples are used to differentiate VOIP and video packets that are being received by a VM 1405. In this example, the dynamic load balancer 555 sets one set of five-tuple filters 1510 in the RX processing engine 511 of the PNIC 515 to route incoming VOIP packets (that are for the VM 1405) to the high priority queue pool 1420, while setting another set of five-tuple filters to route incoming video packets (that are for VM 1405) to the low priority queue pool 1425.

The load balancer 555 sets the five-tuple filters in order to group queues into pools, which it then manages based on different criteria. Specifically, by relying on the gathered statistics in the stats storage 545, the load balancer 555 can determine which addressable nodes to assign to which queues, when to dynamically assign queues to pools, and when to dynamically remove queues from pools, and when to dynamically re-assign addressable nodes to new queues.

In some embodiments, the load balancer periodically (e.g., every few seconds, few milliseconds, few microseconds, etc.) runs a load balancing process. This process pulls stats from the "load stats" data storage 545 that the stat gathering engine maintains, and based on these stats, determines whether it needs to assign addressable nodes to queues, to resize pools, and/or to preempt queues. The load balancer assigns nodes to queues by configuring the five-tuple filters of the PNIC and the virtualization layer to associate a particular queue identifier with a particular five-tuple filter. To configure the filters of the PNIC, the load balancer uses APIs of the PNIC driver to program filters and hardware features for each queue.

As described above by reference to FIGS. 5 and 13, the load balancer 555 in the virtualization layers of FIGS. 14 and 15 has three modules (not shown) in some embodiments. These three modules are (1) the storage that stores the pools, the identifiers of their associated queues, and the addressable node associated with each queue, (2) the queue balancer, and (3) the pool balancer.

The load balancer 555 of FIGS. 14 and 15 applies different processes to manage queues in different "pools." As such, each pool can be viewed as a set of queues that have the same "feature." By applying different processes to manage queues in different pools, the load balancer can optimize the allocation of queues and the resizing of the pools differently for different pools. The pool rebalancer resizes each pool based on the pool's resource allocation criteria and preempts queues from other pools when necessary. Example of such resource allocation criteria (e.g., max/min number of queues of the pool, total CPU utilization of the pool, network traffic of the pool, quality of service (QoS) constraints of the pool, etc.) were provided above.

The queue rebalancer rebalances the queues in the same pool based on the pool's rebalancing criteria, such as packing addressable nodes on as few queues as possible (e.g., for an HLT pool), distributing addressable nodes across as many queues as possible (e.g., for an LLR pool), etc. In some embodiments, the load balancer 555 of FIGS. 14 and 15 manages the PNIC queues to process VM and non-VM addressable nodes by using the processes like those described above by reference to FIGS. 6-9 above. In some of these embodiments, these processes are just modified to monitor and manage not only VM traffic but also traffic to and from non-VM addressable nodes.

V. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement the processes described herein is within the scope of the invention. In some embodiments, the programs, when installed to operate on one or more electronic systems, define one or more specific machine implementations that execute and perform the operations of the software programs.

Figure 16:
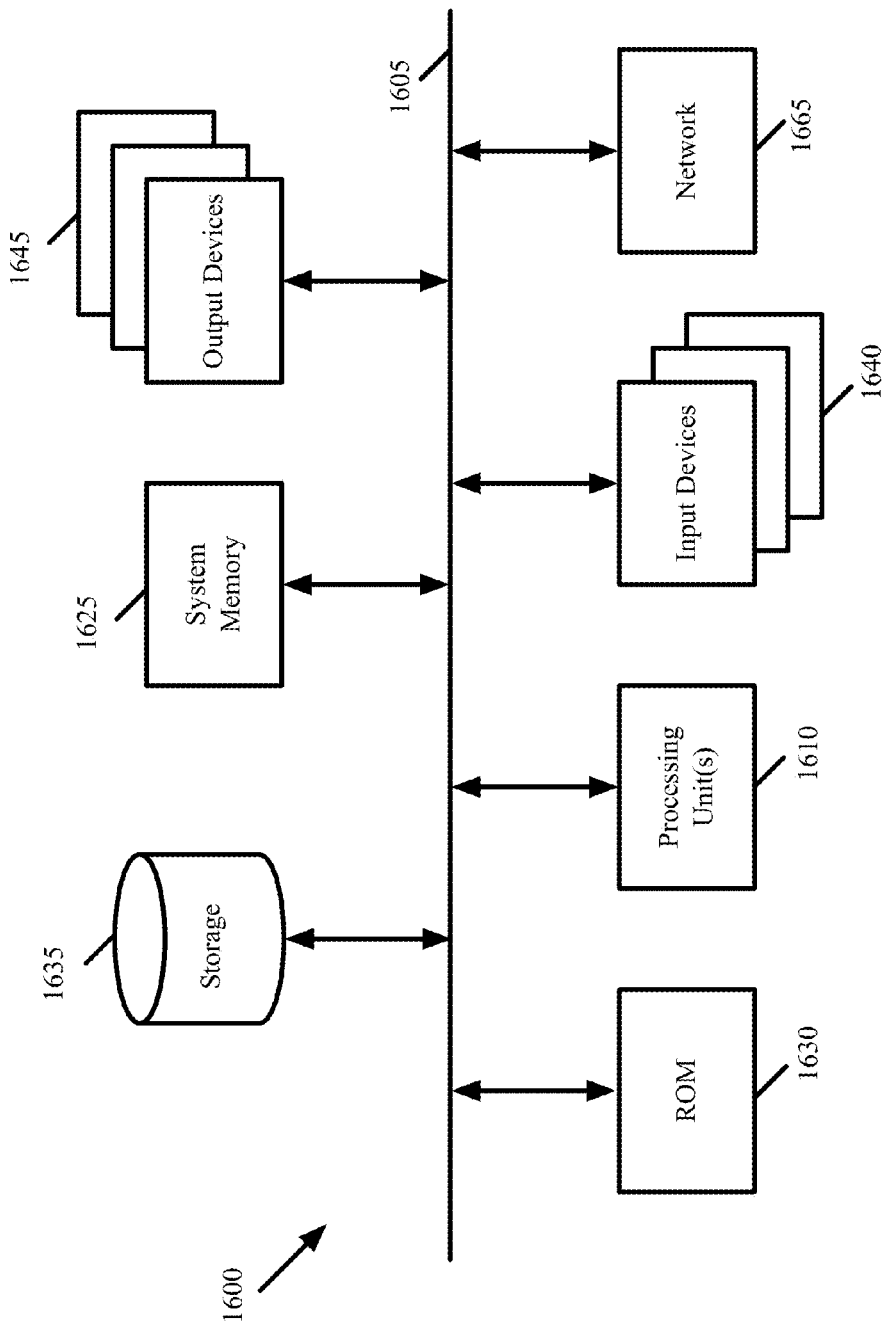
FIG. 16 conceptually illustrates an electronic system with which some embodiments of the invention are implemented.

FIG. 16 conceptually illustrates an electronic system 1600 with which some embodiments of the invention are implemented. The electronic system 1600 can be any of the host devices described above. This system can be any of the devices executing any of the processes and/or queue management systems described above. The electronic system 1600 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1600 includes a bus 1605, processing unit(s) 1610, a system memory 1625, a read-only memory 1630, a permanent storage device 1635, input devices 1640, and output devices 1645.

The bus 1605 collectively represents all system, peripheral, and chipset buses that communicatively connect the numerous internal devices of the electronic system 1600. For instance, the bus 1605 communicatively connects the processing unit(s) 1610 with the read-only memory 1630, the system memory 1625, and the permanent storage device 1635.

From these various memory units, the processing unit(s) 1610 retrieve instructions to execute and data to process in order to execute the processes of the invention. The processing unit(s) may be a single processor or a multi-core processor in different embodiments.

The read-only-memory (ROM) 1630 stores static data and instructions that are needed by the processing unit(s) 1610 and other modules of the electronic system. The permanent storage device 1635, on the other hand, is a read-and-write memory device. This device is a non-volatile memory unit that stores instructions and data even when the electronic system 1600 is off. Some embodiments of the invention use a mass-storage device (such as a magnetic or optical disk and its corresponding disk drive) as the permanent storage device 1635.

Other embodiments use a removable storage device (such as a floppy disk, flash drive, etc.) as the permanent storage device. Like the permanent storage device 1635, the system memory 1625 is a read-and-write memory device. However, unlike storage device 1635, the system memory is a volatile read-and-write memory, such a random access memory. The system memory stores some of the instructions and data that the processor needs at runtime. In some embodiments, the invention's processes are stored in the system memory 1625, the permanent storage device 1635, and/or the read-only memory 1630. From these various memory units, the processing unit(s) 1610 retrieve instructions to execute and data to process in order to execute the processes of some embodiments.

The bus 1605 also connects to the input and output devices 1640 and 1645. The input devices enable the user to communicate information and select commands to the electronic system. The input devices 1640 include alphanumeric keyboards and pointing devices (also called "cursor control devices"). The output devices 1645 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 16, bus 1605 also couples electronic system 1600 to a network 1665 through a network adapter (not shown). In this manner, the computer can be a part of a network of computers (such as a local area network ("LAN"), a wide area network ("WAN"), or an Intranet, or a network of networks, such as the Internet. Any or all components of electronic system 1600 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. In addition, a number of the figures (including FIGS. 6-9) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

We claim:

1. A non-transitory machine readable medium storing a program which when executed by at least one processing unit manages queues of a network interface card (NIC), the program comprising sets of instructions for:
   monitoring data traffic in a particular direction that is either ingress to or egress from the NIC;
   based on the monitoring of data traffic in the particular direction, specifying a first pool and assigning a first set of the queues in the NIC to the first pool, said first pool having a first set of criteria for managing data traffic through the first set of queues in the NIC;
   directing a first subset of the data traffic to the first set of queues in the NIC based on the first set of criteria;
   responsive to monitoring of data traffic in the particular direction through the first set of queues, determining that a second pool should be newly created and assigning a second set of the queues in the NIC to the second pool, said second pool having a second set of criteria for managing data traffic through the second set of queues in the NIC;
   directing a second subset of the data traffic in the particular direction to the second set of queues in the NIC based on the second set of criteria; and
   responsive to monitoring of data traffic in the particular direction through the first and second sets of queues, dynamically adjusting, based on monitoring of data traffic to or from the NIC, the number of the queues in the NIC which are assigned to the first pool in the first set of queues and/or the number of the queues in the NIC which are assigned to the second pool in the second set of queues.

2. The non-transitory machine readable medium of claim 1, wherein the first set of criteria differs from the second set of criteria.

3. The non-transitory machine readable medium of claim 2, wherein each particular pool's set of criteria specifies a maximum threshold amount of data traffic for passing through each queue of the particular pool, wherein the first set of criteria specifies a different maximum threshold than the second set of criteria.

4. The non-transitory machine readable medium of claim 3, the program further comprises a set of instructions for assigning a new queue to a particular pool's set of queues when data traffic through at least a subset of queues in the particular pool exceeds the maximum threshold amount.

5. The non-transitory machine readable medium of claim 4, wherein the subset of queues of the particular pool includes all the queues in the particular pool's set of queues.

6. The non-transitory machine readable medium of claim 4, wherein the subset of queues of the particular pool does not include all the queues in the particular pool's set of queues.

7. The non-transitory machine readable medium of claim 2, wherein each particular pool's sets of criteria specifies a minimum threshold amount of data traffic for passing through each queue of the particular pool, wherein the first set of criteria specifies a different minimum threshold than the second set of criteria.

8. The non-transitory machine readable medium of claim 7, wherein the program further comprises a set of instructions for removing a particular queue from a particular pool's set of queues when data traffic through particular queue is below the minimum threshold amount for a duration of time.

9. The non-transitory machine readable medium of claim 2, wherein:
each particular pool's sets of criteria specifies a threshold amount of data traffic for passing through each queue of the particular pool,
the first set of criteria specifies a maximum threshold amount but not a minimum threshold amount, while the second set of criteria specifies a minimum threshold amount but not a maximum threshold amount.

10. The non-transitory machine readable medium of claim 1, wherein the set of instructions for monitoring data traffic comprises a set of instructions for monitoring data traffic associated with addressable nodes.

11. The non-transitory machine readable medium of claim 1, wherein the first set of queues only includes one queue.

12. The non-transitory machine readable medium of claim 1, wherein the first set of queues includes more than one queue.

13. The non-transitory machine readable medium of claim 1, wherein the set of instructions for directing the first subset of data traffic comprises a set of instructions for specifying a set of filters in the NIC to route the subset of data traffic through the set of queues.

14. The non-transitory machine readable medium of claim 13, wherein the NIC is part of an electronic device, and the set of filters route the subset of data traffic through the set of queues to a set of addressable destination nodes executing on the electronic device.

15. The non-transitory machine readable medium of claim 1, wherein the NIC is part of an electronic device, and wherein the set of instructions for directing the first subset of data traffic comprises a set of instructions for specifying a set of filters that route the subset of data traffic from a set of addressable source nodes executing on the electronic device out of the electronic device through the set of queues.

16. The non-transitory machine readable medium of claim 15, wherein the set of filters is defined in a network layer that shares a set of networking resources on the electronic device with multiple addressable source nodes.

17. The non-transitory machine readable medium of claim 15, wherein the set of filters is defined in a network virtualization layer that shares a set of networking resources on the electronic device with multiple addressable nodes that execute on the electronic device.

18. The non-transitory machine readable medium of claim 15, wherein the sets of instructions for monitoring, specifying and directing are performed by a network virtualization layer that shares a set of networking resources on the electronic device amongst multiple different virtual modules, wherein the set of filters is defined in the network virtualization layer to assign data traffic from different virtual modules to different queues in the plurality of queues.

19. For an electronic device that comprises a network interface card (NIC) with a plurality of queues, a method of managing the queues, the method comprising:
specifying a default pool comprising at least a first queue in the NIC;
assigning a set of data traffic to the default pool, the set of data traffic being in a particular direction either ingress to or egress from the NIC;
monitoring the set of data traffic in the particular direction and, in response to the monitoring, determining that a non-default pool should be newly created and specified to handle a first subset of the set of data traffic;
specifying the non-default pool and allocating a second queue in the NIC to the non-default pool; and
assigning the subset of the data traffic in the particular direction to the second queue in the NIC.

20. The method of claim 19 further comprising:
based on the monitoring, identifying a second subset of the set of data traffic to assign to the non-default pool; and
assigning the second subset to the non-default pool.

21. The method of claim 20, wherein assigning the second subset comprises assigning the second subset to the second queue.

22. The method of claim 20, wherein assigning the second subset comprises assigning the second subset to a third queue that is assigned to the non-default pool.

23. The method of claim 19 further comprising:
monitoring the first subset of data traffic; and
based on the monitoring, re-assigning the first subset of data traffic back to the default pool.

24. The method of claim 23, wherein the re-assigning the first subset comprises re-assigning the first subset back to the first queue.

25. The method of claim 23, wherein the re-assigning the first subset comprises re-assigning the first subset back to a third queue that is assigned to the default pool.

26. The method of claim 19, wherein the different pools have different sets of criteria for assigning data traffic to queues in the pools.

27. The method of claim 26, wherein the sets of criteria for different pools differ in specifying different maximum threshold amount of data traffic for passing through each queue of the particular pool.

28. The method of claim 26, wherein the sets of criteria for different pools differ in specifying different minimum threshold amount of data traffic for passing through each queue of the particular pool.

29. The method of claim 26, wherein the sets of criteria for different pools differ in specifying different threshold amount of data traffic for passing through each queue of the particular pool, wherein one pool specifies a maximum threshold while another pool specifies a minimum threshold.

30. The method of claim 19, wherein the set of data traffic comprises data traffic associated with addressable nodes executing on the electronic device.

31. The method of claim 30, wherein the addressable nodes comprise at least one of a virtual machine (VM), a storage volume mounter, and a VM migrator.

32. A method of managing a plurality of queues in a network interface card (NIC) of a host that executes a plurality of virtual machines (VMs), the method comprising:
for data traffic flowing in a particular direction that is either ingress to or egress from the NIC, specifying first and second pools that define first and second groupings of at least a subset of the queues in the NIC, at least one of the first and second pools comprising a plurality of queues which operate in parallel to handle data traffic in the particular direction;
based on a first set of criteria, specifying an allocation of a first set of VMs to the queues in the NIC in the first pool; and
based on a second set of criteria, specifying an allocation of a second set of VMs to the queues in the NIC in the second pool, wherein the first and second sets of criteria are different.

33. The method of claim 32,
wherein specifying the allocation of the first set of VMs comprises using a first set of processes to specify the allocation;
wherein specifying the allocation of the second set of VMs comprises using a second set of processes to specify the allocation, wherein the first and second set of processes are different processes.

* * * * *